(12) United States Patent
Rappaport et al.

(10) Patent No.: US 12,346,631 B2
(45) Date of Patent: Jul. 1, 2025

(54) AUDIO COMMUNICATION DEVICE WITH NOVEL VISUAL INDICATIONS AND ADJUSTABLE MUTING

(71) Applicant: Microsoft Technology Licensing, LLC, Redmond, WA (US)

(72) Inventors: David Justin Rappaport, San Francisco, CA (US); Russell I. Sanchez, Seattle, WA (US); Flavio Protasio Ribeiro, Bellevue, WA (US); Woo Suk Lee, Fort Lee, NJ (US); Bryan K. Mamaril, Seattle, WA (US); Katherine M. Bailey, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 17/752,478

(22) Filed: May 24, 2022

(65) Prior Publication Data

US 2023/0385014 A1 Nov. 30, 2023

(51) Int. Cl.
*G06F 3/16* (2006.01)
*G06F 3/0481* (2022.01)
(Continued)

(52) U.S. Cl.
CPC ............ *G06F 3/165* (2013.01); *G06F 3/0481* (2013.01); *G10K 11/17854* (2018.01);
(Continued)

(58) Field of Classification Search
CPC ...... H04R 29/008; H04R 3/005; H04R 1/406; G10K 2210/3056; G10K 2210/3028;
(Continued)

(56) References Cited

U.S. PATENT DOCUMENTS 10,148,912 B1 * 12/2018 Oliver ................... H04M 3/563
11,462,232 B1 * 10/2022 Wang .................... H04R 29/008
(Continued)

FOREIGN PATENT DOCUMENTS

WO   WO-2015046034 A1 * 4/2015 ............ G10L 25/03
WO      2020076779 A1    4/2020

OTHER PUBLICATIONS

"International Search Report and Written Opinion Issued in PCT Application No. PCT/US23/012972", Mailed Date: Jun. 16, 2023, 16 Pages.
(Continued)

*Primary Examiner* — Carolyn R Edwards
*Assistant Examiner* — Kuassi A Ganmavo

(57) ABSTRACT

Aspects of the present disclosure relate to an audio communication device with novel visual indications and adjustable muting. In examples, an audio communication device is provided. The audio communication device includes at least one processor, and memory storing instructions that, when executed by the at least one processor, cause the audio communication device to perform a set of operations. The set of operations include generating a first visual indicator. The first visual indicator corresponds to audio of one or more users. The set of operations further include receiving a user-input, muting a microphone region of the audio communication device, based on the user-input, and generating a second visual indicator. The second visual indicator replaces at least a portion of the first visual indicator. The second visual indicator corresponds to the muted region. The first visual indicator is indicative of a quality of the audio.

20 Claims, 17 Drawing Sheets
(8 of 17 Drawing Sheet(s) Filed in Color)

(51) Int. Cl.
    *G10K 11/178* (2006.01)
    *G10L 25/60* (2013.01)
    *H04R 3/00* (2006.01)
    *H04R 29/00* (2006.01)

(52) U.S. Cl.
    CPC ............ *G10L 25/60* (2013.01); *H04R 29/008* (2013.01); *G10K 2210/3028* (2013.01); *G10K 2210/3056* (2013.01); *H04R 3/005* (2013.01)

(58) Field of Classification Search
    CPC . G10K 11/17854; G06F 3/0481; G06F 3/165; G10L 25/60
    See application file for complete search history.

(56) References Cited

U.S. PATENT DOCUMENTS

| | | | | |
|---|---|---|---|---|
| 2007/0165834 | A1* | 7/2007 | Redman | H04M 1/72454 379/420.01 |
| 2012/0163610 | A1* | 6/2012 | Sakagami | H04S 7/30 381/56 |
| 2013/0156204 | A1* | 6/2013 | Schulz | H04M 3/569 381/56 |
| 2016/0012827 | A1* | 1/2016 | Alves | G10K 11/17857 381/71.1 |
| 2016/0093291 | A1* | 3/2016 | Kim | G10L 25/60 381/56 |
| 2016/0119459 | A1* | 4/2016 | Clementson | G02B 6/0001 362/558 |
| 2018/0352315 | A1* | 12/2018 | Gelling | H04M 1/72454 |
| 2019/0066456 | A1* | 2/2019 | Clark | G01F 23/2966 |
| 2019/0293279 | A1* | 9/2019 | Nakatsukasa | G02B 6/0021 |
| 2019/0341057 | A1* | 11/2019 | Zhang | G10L 25/78 |

OTHER PUBLICATIONS

"Speak 510", Retrieved from: https://web.archive.org/web/20220126234846/https://www.jabra.com/business/speakerphones/jabra-speak-series/jabra-speak-510, Jan. 26, 2022, 12 pages.

"Stem Table", Retrieved from: https://web.archive.org/web/20211120021742/https://www.shure.com/en-us/products/microphones/stem_table, Nov. 20, 2021, 16 Pages.

"Invitation to Pay Additional Fee Issued in PCT Application No. PCT/US23/012972", Mailed Date: Apr. 25, 2023, 12 Pages.

* cited by examiner

AUDIO COMMUNICATION DEVICE WITH NOVEL VISUAL INDICATIONS AND ADJUSTABLE MUTING

BACKGROUND

When a user speaks into an audio communication device (e.g., a phone, computer, tablet, speakerphone, etc.) they may be unable to tell whether or not their voice is being received clearly by the device. If their voice is not being received clearly, then poor audio quality may be transmitted to a person on the other end of a call. Furthermore, audio communication devices may capture undesired noise (e.g., noise which may be present in or around an environment in which the audio communication device is located). Poor audio quality and undesired noises can be frustrating, and may reduce a user's experience, while they are using an audio communication device.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to methods, systems, and media for an audio communication device with novel visual indications and adjustable muting.

In some aspects of the present disclosure, an audio communication device is provided. The audio communication device includes at least one processor, and memory storing instructions that, when executed by the at least one processor, cause the audio communication device to perform a set of operations. The set of operations include generating a first indicator. The first indicator corresponds to audio of one or more users. The set of operations further include receiving a user input, muting a region of the audio communication device, based on the user-input, and generating a second indicator. The second indicator replaces at least a portion of the first indicator, and the second indicator corresponds to the muted region. The first indicator is indicative of a quality of the audio.

In some aspects of the present disclosure, an audio communication device is provided. The audio communication device includes a base defining a plane extending thereacross, at least one processor, and memory storing instructions that, when executed by the at least one processor, cause the audio communication device to perform a set of operations. The set of operations include receiving audio data, and generating a first indicator. The first indicator corresponds to a first subset of the audio data. The first subset corresponds to one or more users. The set of operations further include generating a second indicator. The second indicator corresponds to a second subset of the audio data. The second subset corresponds to ambient noise. One of the first indicator or the second indicator are capable of overlaying the other of the first indicator or the second indicator, with respect to the plane, to indicate a potential disturbance of the ambient noise on audio quality of the one or more users.

In some aspects of the present disclosure, an audio communication device is provided. The audio communication device includes at least one processor, and memory storing instructions that, when executed by the at least one processor, cause the audio communication device to perform a set of operations. The set of operations include receiving audio data, identifying a plurality of users, based on the audio data, and generating a plurality of indications. Each of the indications correspond to a respective one of the plurality of users. The set of operations further include receiving a user-input, corresponding to a section of one of the plurality of indications, and muting audio from one of the plurality of users, based on the user-input. The muting of the audio from the one of the one or more users includes filtering out a subset of the audio data. The subset of the audio data corresponds to the one of the plurality of users.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Non-limiting and non-exhaustive examples are described with reference to the following Figures.

DETAILED DESCRIPTION

Figure 1:
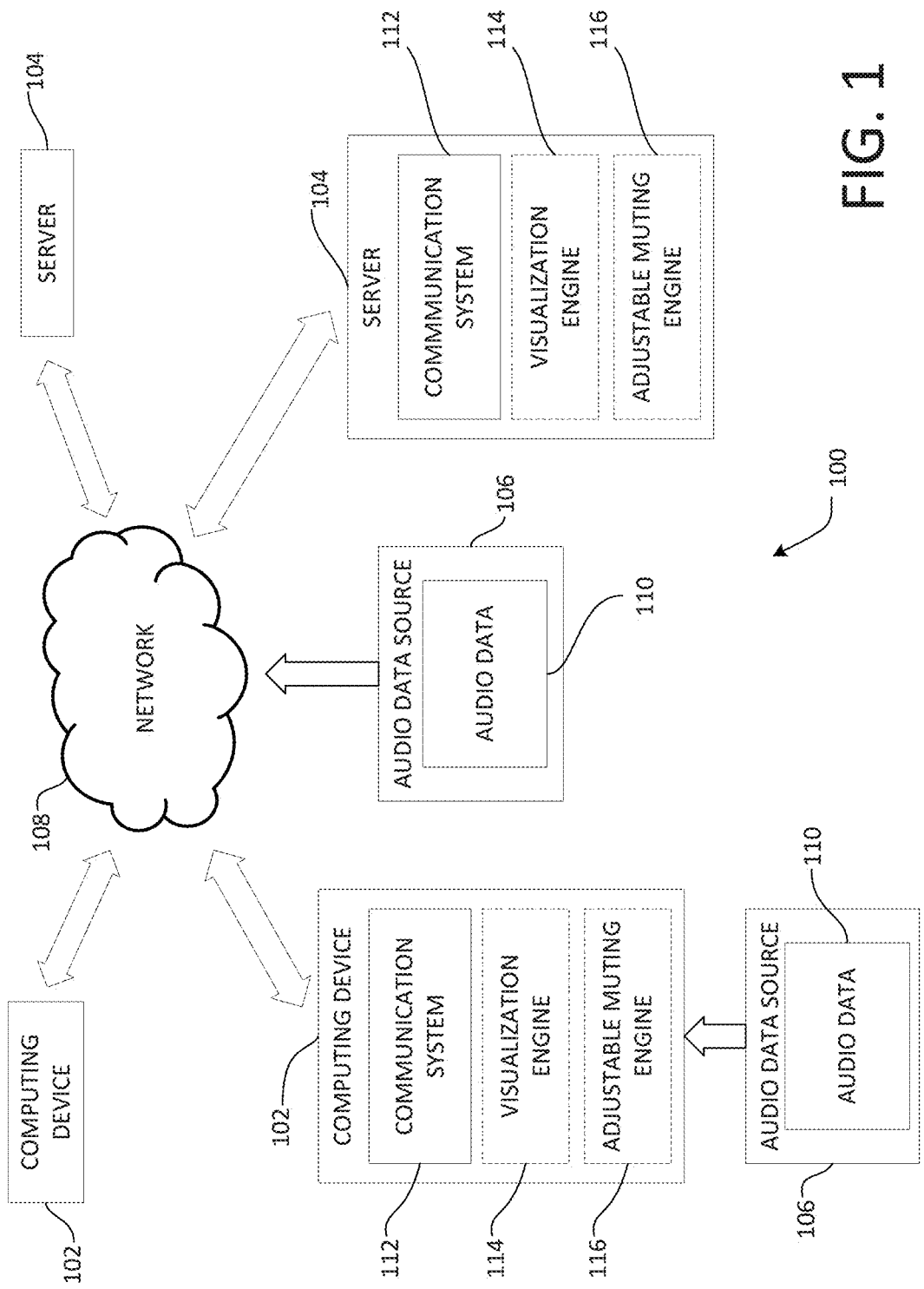
FIG. 1 illustrates an overview of an example system for an audio communication device with novel visual indications and adjustable muting, according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The rise of remote work in recent years has prompted an increase in consumer attention to devices that remote workers may use, when performing tasks remotely. However, conventional devices that may be used for teleconferencing (remotely, in a professional setting, etc.) are deficient. Referring specifically to audio communication devices (e.g., phones, computers, tablets, speakerphones, etc.), when a user speaks into an audio communication device, the user may be unable to tell whether or not their voice is being received clearly by the audio communication device. In such instances, a person on the other end of a teleconferencing call may be unable to hear the speaker (e.g., the user), and may be unable to notify the speaker of the speaker's poor audio quality, until after the speaker is done speaking. Such poor audio quality can be frustrating, and reduce an experience of users on both ends of a teleconferencing call.

Furthermore, conventional audio communication devices may capture and transmit undesired audio (e.g., undesired noise which may be present in or around an environment in which the audio communication device is located). For example, undesired noises that may be present in or around an environment in which an audio communication device is located could include a nearby office meeting, a dog barking, children playing nearby, vehicle traffic, etc. Such undesired noises can be picked up by an audio communication device and subsequently distract one or more users who are participating in a call, via the audio communication device. Additionally, or alternatively, such undesired noises can reduce comprehension of a person who is speaking, by others who are participating in a call, via the audio communication device.

Aspects of the present disclosure are useful to cure the above-mentioned deficiencies, as well as providing additional benefits that may be discussed herein, or recognized by those of ordinary skill in the art. Examples of the present disclosure relate to systems and methods for an audio communication device with novel visual indications and adjustable muting.

In some examples, an indication (e.g., a visual indication, an audio indication, etc.) can help a person who is speaking into an audio communication device (e.g., a phone, computer, tablet, speakerphone, etc.) to understand whether their voice is being heard clearly, in real time, as they are speaking. For example, a visual indicator on the audio communication device could turn green, when someone's voice is being heard clearly (e.g., audio quality is above a specified threshold), or red when someone's voice is becoming unintelligible (e.g., audio quality is below a specified threshold). When the audio communication device indicates that the person's voice is unintelligible, the person can take action to improve their audio quality (e.g., by speaking louder, moving closer to the speakerphone device, etc.). Further the indication can be directional, thereby providing multiple cues corresponding to audio quality of people who are speaking, at the same time.

Still further, in some examples according to the present disclosure, a pickup angle or field of microphones can be adjusted to allow an audio communication device to reduce the amount of audio which is captured from directions in which distracting noise may be present. Additionally, or alternatively, using digital signal processing, specific noises that are identified by the audio communication device can be filtered out from audio data that is desired to be received by the audio communication device (e.g., the audio of a focal person talking), such that only desired audio data is transmitted to one or more users on the other end of a call. Additionally, or alternatively, beamforming techniques may be used to suppress unwanted noise.

FIG. 1 shows an example of a system 100 for an audio communication device with novel visual indications and adjustable muting, in accordance with some aspects of the disclosed subject matter. The system 100 includes one or more computing devices 102 (e.g., one or more audio communication devices, such as, for example, phones, tablets, computers, or speakerphones), one or more servers 104, an audio data source 106, and a communication network or network 108. The computing device 102 can receive audio data 110 from the audio data source 106, which may be, for example a person who is speaking, a computer-executed program that generates audio, etc. Additionally, or alternatively, the network 108 can receive audio data 110 from the audio data source 106, which may be, for example a person who is speaking, a computer-executed program that generates audio, etc.

Computing device 102 may include a communication system 112, a visualization engine or component 114, and an adjustable muting engine or component 116. In some examples, computing device 102 can execute at least a portion of visualization component 114 to generate one or more visual indicators corresponding to audio quality of a user, corresponding to audio of identified users, and/or corresponding to ambient noise based at least in part on the audio data 110. Further, in some examples, computing device 102 can execute at least a portion of adjustable muting component 116 to identify in which direction undesired noise is originating, performing digital signal processing to filter out undesired noise, and/or to mute microphone regions of the computing device 102, based at least in part on the audio data 110.

Server 104 may include a communication system 112, a visualization component or engine 114, and an adjustable muting component or engine 116. In some examples, server 104 can execute at least a portion of visualization component 114 to generate one or more visual indicators (e.g., on a computing device, periphery device, display screen, etc.) corresponding to audio quality of a user, corresponding to audio of identified users, and/or corresponding to ambient noise based at least in part on the audio data 110. Further, in some examples, server 104 can execute at least a portion of adjustable muting component 116 identify in which direction undesired noise is originating, performing digital signal processing to filter out undesired noise, and/or to mute microphone regions of a computing device (e.g., computing device 102), based at least in part on the audio data 110.

Additionally, or alternatively, in some examples, computing device 102 can communicate data received from audio data source 106 to the server 104 over a communication network 108, which can execute at least a portion of visualization component 114, and/or adjustable muting component 116. In some examples, visualization component 114 may execute one or more portions of methods/processes 300, 500, and/or 700 described below in connection with FIGS. 3, 5, and 7. Further, in some examples, adjustable muting component 116 may execute one or more portions of methods/processes 300, 500, and/or 700 described below in connection with FIGS. 3, 5, and 7.

In some examples, computing device 102 and/or server 104 can be any suitable computing device or combination of devices, such as a desktop computer, a laptop computer, a smartphone, a tablet computer, a wearable computer, a server computer, a speakerphone, a virtual machine being executed by a physical computing device, etc. Further, in some examples, there may be a plurality of computing device 102 and/or a plurality of servers 104, such as in examples where there are a plurality of audio communication devices.

While the illustrated example system 100 shows two computing devices 102 and two servers 104, it should be recognized that systems in accordance with aspects of the present disclosure may include any number of computing devices 102 (e.g., audio communication devices), and/or servers 104. Further, the number of audio data sources may be greater than, equal to, or less than the number of computing devices and/or servers, such as in instances where a plurality of people are surrounding a computing device (e.g., an audio communication device, such as, for example, a phone, tablet, computer, or speakerphone).

In some examples, audio data source 106 can be any suitable source of audio data (e.g., data generated from a computing device, data provided by a user, etc.). In a more particular example, audio data source 106 can include memory storing audio data (e.g., local memory of computing device 102, local memory of server 104, cloud storage, portable memory connected to computing device 102, portable memory connected to server 104, etc.).

In another more particular example, audio data source 106 can include an application configured to generate audio data (e.g., a video-conferencing application that collects audio from a user, a tele-conferencing application that collects audio from a user, and/or an audio generation/recording application being executed by computing device 102, server 104, and/or any other suitable computing device). In some examples, audio data source 106 can be local to computing device 102. Additionally, or alternatively, audio data source 106 can be remote from computing device 102 and can communicate audio data 110 to computing device 102 (and/or server 104) via a communication network (e.g., communication network 108).

In some examples, communication network 108 can be any suitable communication network or combination of communication networks. For example, communication network 108 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some examples, communication network 108 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 1 can each be any suitable communications link or combination of communication links, such as wired links, fiber optics links, Wi-Fi links, Bluetooth links, cellular links, etc.

Figure 2A:
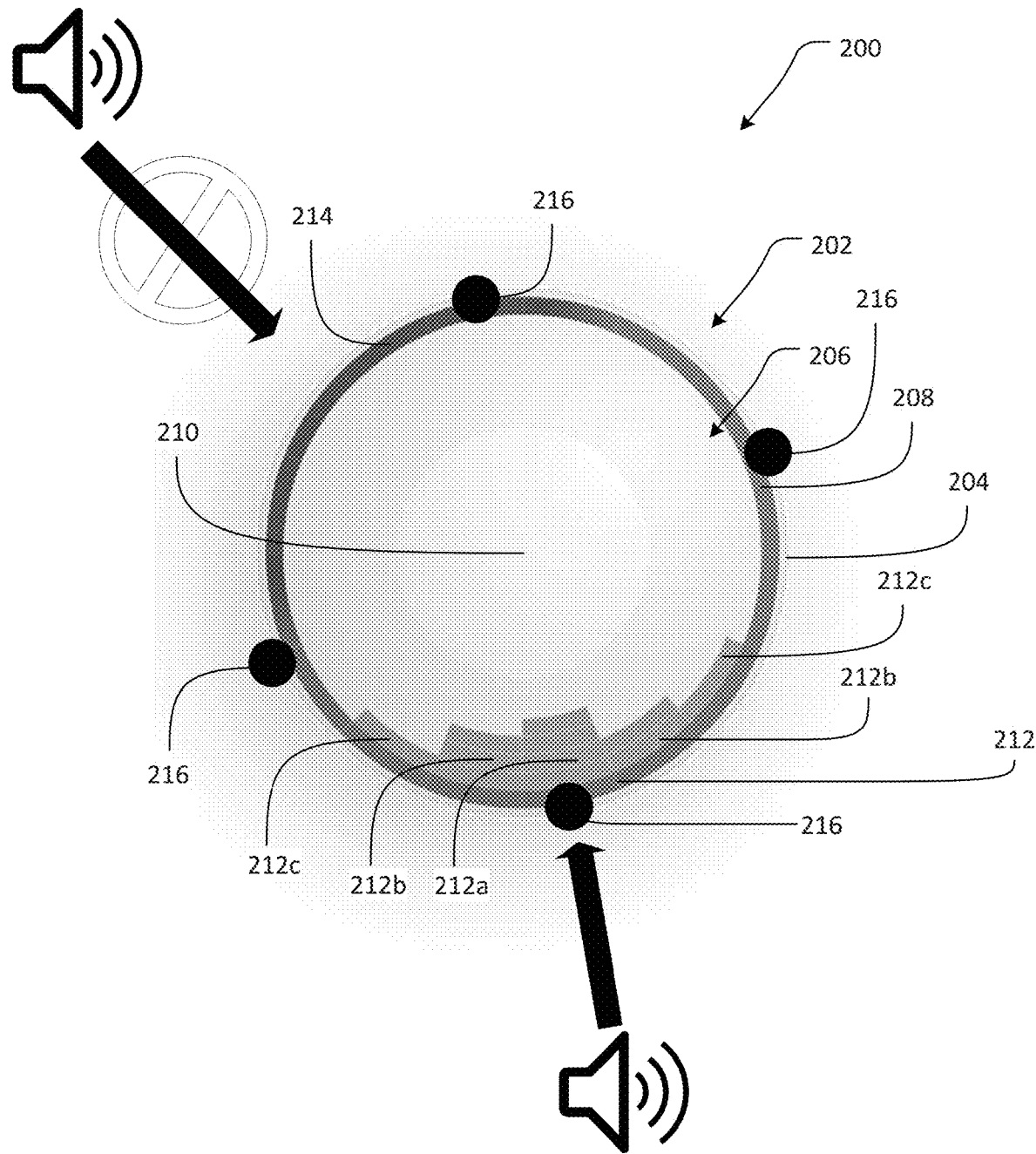
FIG. 2A illustrates an overview of an example audio communication device with novel visual indications and adjustable muting, according to aspects described herein.
Figure 2B:
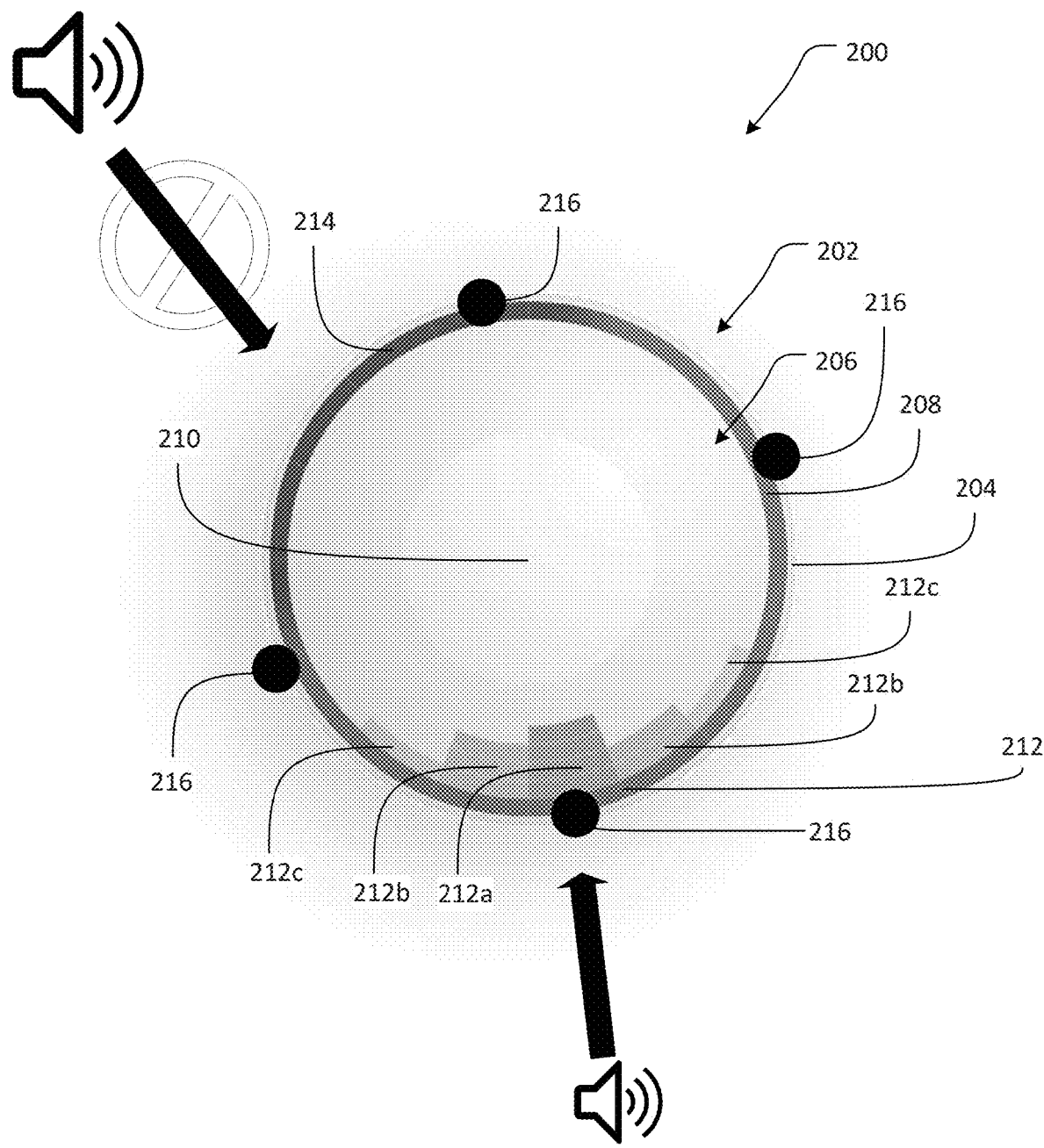
FIG. 2B illustrates an overview of an example audio communication device with novel visual indications and adjustable muting, according to aspects described herein.

FIGS. 2A and 2B illustrates an overview of an example audio communication device or device 200 with novel visual indications and adjustable muting, according to aspects described herein. The device 200 may be similar to the computing device 102 (e.g., the device 200 may include the communication system 112, the visualization component 114, and/or the adjustable muting component 116).

As shown in FIGS. 2A and 2B, the device 200 includes a body 202. The body 202 includes a base 204 and a user-interface 206. The base 204 may define a plane extending thereacross (e.g., parallel to the page). The user-interface 206 may be disposed on a surface of the body 202 that is opposite from the base 204. In alternative examples, the user-interface 206 may be disposed on a surface of the body 202 that is adjacent to the base 204. The body 202 may be generally cylindrical. Alternatively, the body 202 may be cubical, prismatic, or any other shape. Accordingly, the base 204 may be circular, ovular, rectangular, square, or any other polygonal shape. The body 202 may define a peripheral edge 208, and a center point 210. The peripheral edge 208 may extend around the user-interface 206. Further, the center point 210 may be the geometric center point of the user-interface 206. In the illustrated example of FIG. 2A, the center point 210 may define a central axis extending through the body (e.g., orthogonally into the page), around which the body 202 and/or the user-interface 206 is disposed symmetrically (e.g., radial-symmetrically).

In some examples, the user-interface 206 may be a display screen with user-interface capabilities (e.g., touch screen with a graphical user-interface, buttons, sliders, keyboard-input, mouse-input, etc.). Additionally, or alternatively, the user-interface 206 may include a plurality of buttons, a plurality of sliders, a plurality of lights, and/or a combination thereof. For example, the user-interface may comprise four buttons that each occupy a quadrant of the user-interface 206. Alternatively, the user-interface may comprise four sliders that each occupy a quadrant of the user-interface 206. Further orientations of user-interface capabilities will be apparent to those of ordinary skill in the art.

The user-interface 206 may include a plurality of indicators, such as a first indicator 212, and a second indicator 214. In the example device of FIGS. 2A and 2B, the first and second indicators 212 and 214 are visual indicators. However, it is also considered that the plurality of indicators could additionally, or alternatively, be audio indicators (e.g., that each have unique sounds or patterns to differentiate between the different indicators).

The first indicator 212 may correspond to if a region of the audio communication device 200 is actively receiving audio to be transmitted (i.e., the region is not muted). The first indicator 212 may provide information to a user regarding a noise level of audio that is received by the device 200 (e.g., based on audio data, such as audio data 110). For example, a height of the first indicator 212 may be adjusted based on a noise level of audio that is received by the device 200. If the noise level increases, then a height of the first indicator (e.g., as measured from peripheral edge 208 to center point 210) may increase. Alternatively, if the noise level decreases, then the height of the first indicator 212 may decrease. Further, the first indicator 212 may provide information to a user regarding a direction from which audio or noise is being received (e.g., based on audio data, such as audio data 110). For example, the first indicator 212 may be generally angled to extend along the same direction in which audio is received at the device 200. Determining a direction from which audio is received may be based on any conventional method known to those of ordinary skill in the art.

The first indicator 212 may further provide an indication of a quality of audio that is received (e.g., from one or more person). The quality of audio may be determined based on one or more from the group of a signal-to-noise ratio, a signal-to-reverberation ratio, a signal-to-interference ratio, and a mean opinion score. For example, a signal-to-noise ratio may be calculated, based on received audio data (e.g., audio data 110). The signal-to-noise ratio may be calculated using conventional methods available to one of ordinary skill in the art to compare a level of desired signal to a level of background noise (as determined via processing of the audio data). If the signal-to-noise ratio is above a first threshold, then the audio quality may be determined to be good. Alternatively, if the signal-to-noise ratio is between the first threshold and a second threshold, then the audio quality may be determined to be neutral. Alternatively, if the signal-to-noise ratio is below the second threshold, then the audio quality may be determined to be bad.

Similar determinations as discussed above with respect to the signal-to-noise ratio may be made with respect to the signal-to-reverberation ratio. For example, the signal-to-reverberation ratio may be calculated, based on received audio data (e.g., audio data 110). The signal-to-reverberation ratio may be calculated using conventional methods available to one of ordinary skill in the art. If the signal-to-reverberation ratio is above a first threshold, then the audio quality may be determined to be good. Alternatively, if the signal-to-reverberation ratio is between the first threshold and a second threshold, then the audio quality may be determined to be neutral. Alternatively, if the signal-to-reverberation ratio is below the second threshold, then the audio quality may be determined to be bad.

Similar determinations as discussed above with respect to the signal-to-noise ratio and the signal-to-reverberation ratio may be made with respect to the signal-to-interference ratio. For example, the signal-to-interference ratio may be calculated, based on received audio data (e.g., audio data 110). The signal-to-interference ratio be calculated using conventional methods available to one of ordinary skill in the art. If the signal-to-interference ratio is above a first threshold, then the audio quality may be determined to be good. Alternatively, if the signal-to-interference ratio is between the first threshold and a second threshold, then the audio quality may be determined to be neutral. Alternatively, if the signal-to-interference ratio is below the second threshold, then the audio quality may be determined to be bad.

Systems disclosed herein may further determine a mean opinion score, based on received audio data (e.g., audio data 110). The determination of the mean opinion score differs from the methods of determining the signal-to-noise ratio, signal-to-reverberation ratio, and signal-to-interference ratio in that the mean opinion score based on popular opinion. For example, a mean opinion score may be calculated by providing an audio sample to a plurality of users, and a scale (e.g., a scale from 1 to 5, wherein 1 is the poorest quality, and 5 is the best quality). The plurality of users may assign a number from the scale to the audio sample. Then, the assigned number from each of the plurality of users may be average to calculate the mean opinion score. A machine-learning model may be trained to calculate a mean opinion score for an audio sample, based on data sets wherein audio samples are pre-assigned values from a scale, by a plurality of users. Therefore, if a calculated mean opinion score (e.g., that is determined based on a plurality of users, or that is output from a trained machine-learning model) is above a first threshold, then the audio quality may be determined to be good. Alternatively, if the calculated mean opinion score is between the first threshold and a second threshold, then the audio quality may be determined to be neutral. Alternatively, if the calculated mean opinion score is below the second threshold, then the audio quality may be determined to be bad.

A determination of the audio quality may be based on any one of the signal-to-noise ratio, signal-to-reverberation ratio, signal-to-interference ratio, or mean opinion score. Alternatively, a determination of the audio quality may be based on any combination of the signal-to-noise ratio, signal-to-reverberation ratio, signal-to-interference ratio, and mean opinion score. For example, a weight value may be assigned to each ratio and/or score that is included in the combination, and the ratios and/or score may be factored into one audio quality score that is used to generate the first indicator 212, based on the assigned weight values. In some examples, methods of determining audio quality that are recognized by those of ordinary skill in the art may be used in addition to, or as an alternative to mechanisms for determining audio quality, as disclosed herein. Accordingly, the first indicator 212 can provide information to a user regarding a quality of received audio (e.g., based on audio data 110).

The first indicator 212 can include one or more hues. For example, referring specifically to FIG. 2A, the first indicator 212 is green. When the first indicator 212 is green or a first hue, then the quality of audio that is received by the device 200 can be good (e.g., above a first threshold, as discussed above). Turning now to FIG. 2B, the first indicator 212 includes a plurality of hues, namely green or the first hue, light green or a second hue, and yellow or a third hue. Each of the plurality of hues may be indicative of a different level of audio quality. The first indicator 212 may include the first hue, when the audio quality is above a first threshold. The first indicator 212 may further include the second hue, when the audio quality is below the first threshold, and above a second threshold. The audio quality may further include the third hue, when the audio quality is below the second threshold, and above a third threshold. It should be recognized by one of ordinary skill in the art that the first indicator 212 can be configured or otherwise programmed to include any number of hues that correspond to any designated audio quality ranges.

Furthermore, while the first indicator 212 is described to visualize audio quality using hues, it is contemplated that audio quality could be otherwise visualized. For example, the first indicator 212 may include a plurality of dots, wherein a size of the dots is indicative of a quality of audio (e.g., a larger dot has relatively better audio quality than a smaller dot, or vice-versa). In some examples, the first indicator 212 may include one or more icons that are each indicative of an audio quality. In some examples, the first indicator 212 may include 3D graphics, such as bars, that are indicative of audio quality. In some examples, the first indicator 212 may include one or more animations that are each indicative of a respective audio quality. Further examples of visualization that may be used to provide an indication of audio quality to a user may be recognized by those of ordinary skill in the art.

Still referring to FIG. 2B, the user-interface 206 is updated, relative to FIG. 2A, based on a change in audio data (e.g., audio data 110) that is received by the device 200. In the illustrated example of device 200, the audio quality decreased from FIG. 2A to FIG. 2B (e.g., over a duration of time). Based on the first indicator 212 of FIG. 2B, a user may receive information that prompts them to take corrective action to improve their audio quality (e.g., speak louder, move closer to the device 200, move a location of the device 200, etc.). A user may recognize that audio quality has improved, from their corrective action, based on a change in the first indicator 212 (e.g., a hue of the first indicator 212 going from yellow to green).

In some examples, the first indicator 212 includes a plurality of segments, such as a first segment 212a with a first hue (e.g., dark green in FIG. 2B), a second segment 212b with a second hue (e.g., light green in FIG. 2B), and a third segment 212c with a third hue (e.g., yellow in FIG. 2B). The first segment 212a, second segment 212b, and third segment 212c may be any of a plurality of hues. A difference in height between the segments 212a, 212b, and 212c may indicate a difference in volume being received therealong the audio communication device 200. For example, referring specifically to FIG. 2B, audio received at the first segment 212a may be louder than audio received at the second segment 212b, which may be louder than audio received at the third segment 212c. Further, a difference in color, pattern, shape, brightness, and/or graphic image of the segments 212a, 212b, and 212c may indicate a difference in audio quality that is being received. For example, the audio communication device 200 may receive higher quality audio at the first segment 212a, than at the second segment 212b, which may receive higher quality audio than the third segment 212c. Alternatively, if the segments 212a, 212b, and 212c are all the same color, pattern, shape, brightness, and/or graphic image (e.g., as shown in FIG. 2A), then the audio quality that is being received corresponding to each of the segments 212a, 212b, and 212c may be substantially the same.

The device 200 may further include one or more microphones 216 that receive audio to produce audio data (e.g., audio data 110). The one or more microphones 216 may be a plurality of microphones 216. The plurality of microphones 216 may be disposed along, and/or adjacent to, the peripheral edge 208 of the device body 202. The one or more microphones 216 may be omnidirectional microphones. Additionally, or alternatively, the one or more microphones 216 may be directional microphones. In some examples, the one or more microphones 216 are omnidirectional microphones that are configured or otherwise programmed to function as directional microphones, as a result of digital signal processing techniques that are trained based on trained models (e.g., neural networks or other machine-learning models) to pick up sound from a polar direction, or range of polar directions (e.g., sound may be picked up from any direction within one or more specified angular ranges along the periphery edge 208, as measured around the center point 210). Further, in some examples, conventional beam-forming techniques can be used to configure or otherwise program the omnidirectional microphones to function as directional microphones.

Referring now to the second indicator 214 of FIGS. 2A and 2B, the second indicator 214 may correspond to if a region of the device 200 is not actively receiving audio, or whether audio that is received within the region is being filtered (i.e., the region is muted). For example, if one or more of the microphones 216 are disposed within a region of the device 200, as indicated by the second indicator 214, then the one or more of the microphones 216 may be turned off, or a gain of the one or more of the microphones 216 may be reduced (e.g., by 25%, 50%, 75%, 99%, etc.). Additionally, or alternatively, digital processing (e.g., active noise-cancelling, or another form of noise-cancelling) may be performed on audio that is received by the one or more microphones 216 to mute the region of the device 200 indicated by the second indicator 214.

The second indicator 214 may be generated based on user-input. For example, with respect to FIGS. 2A and 2B, a user may select (via their finger, a stylus, a button, an input device, etc.) a portion of the user-interface 206 (e.g., along the periphery edge 208). The portion of the user-interface 206 that is selected (e.g., a portion along the periphery edge 208), based on the user-input, may then display the second indicator 214. In some examples, the second indicator 214 may replace at least a portion of the first indicator 216. In other examples, the second indicator 214 may be provided adjacent to, or otherwise in addition to, the first indicator 216. The second indicator 214 may be a visual indicator that include a hue, such as red. The hue of the second indicator 214 may be different than the hue (or plurality of hues) of the first indicator 216 to provide an indication to a user regarding which portions of the device 200 are muted, and which portions are not muted.

As discussed above, the second indicator 214 can be generated based on user-input, depending on from which directions a user would like for audio to be muted. Additionally, or alternatively, a gain of noise-cancelling digital processing that is performed on audio can be adjustable, based on the user-input. For example, if the user-input is provided via a button or touchscreen, then the gain of noise-cancelling digital processing can correspond to how many times the button or touchscreen is clicked or tapped. With one click/tap, received audio along a region indicated by the second visual indicator 214 may be reduced by 50%. With two clicks/taps, received audio along the region may be reduced by 75%. With three click/taps, received audio along the region may be fully muted (i.e., reduced by 100%). With four clicks/taps, received audio along the region may be un-muted, and the second indicator 214 may be replaced by the first indicator 212 to indicate that the region is now un-muted.

While the example device 200 illustrated in FIGS. 2A and 2B shows one first indicator 212 and one second indicator 214, it is also possible that there may be a plurality of first indicators 212 and a plurality of second indicators 214, such as in instances where regions of the device 200 alternate between muted and un-muted. Further, in some examples, there may be a plurality of users disposed around the device 200 who may have different preferences regarding whether the region of the device 200 corresponding to the direction in which they are disposed is muted or un-muted. Accordingly, the device 200 may receive a plurality of user-inputs that each correspond to a respective one of the plurality of users to generate first and second indicators 212, 214, based on the user-inputs.

Figure 3:
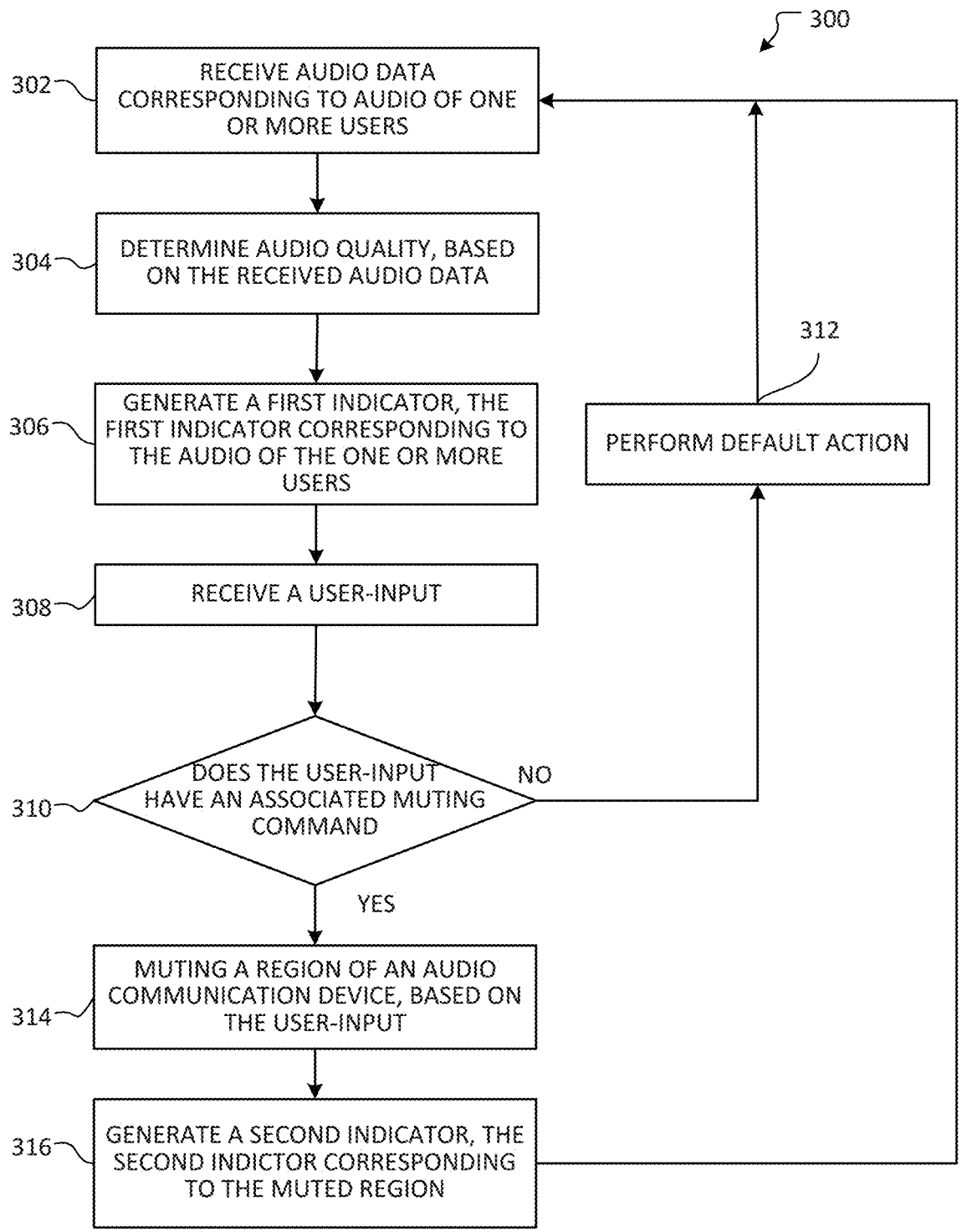
FIG. 3 illustrates an overview of an example method for generating novel visual indications and muting regions of an audio communication device, according to aspects described herein.

FIG. 3 illustrates an overview of an example method 300 for generating novel visual indications and muting regions of an audio communication device, according to aspects described herein. In examples, aspects of method 300 are performed by a device, such as computing device 102, server 104, and/or device 200 discussed above with respect to FIGS. 1, and 2.

Method 300 begins at operation 302, wherein audio data (e.g., audio data 110) is received that corresponds to audio of one or more users. The audio data may further correspond to ambient noise (e.g., traffic, nearby meetings, animal sounds, etc.). The audio data may be generated by one or more microphones (e.g., microphones 216) that receive noise from an environment and generate audio data, based on the noise, for further processing. Additionally, or alternatively, the audio data may be received from a server (e.g., server 104), or a computing device (e.g., computing device 102) that is remote from a location at which the audio data is received.

At operation 304, an audio quality is determined, based on the received audio data. The audio quality may correspond to the audio quality of one or more users that are speaking into an audio communication device (e.g., device 200). The quality of audio may be determined based on one or more from the group of a signal-to-noise ratio, a signal-to-reverberation ratio, a signal-to-interference ratio, and a mean opinion score. For example, a signal-to-noise ratio may be calculated, based on received audio data (e.g., audio data 110). The signal-to-noise ratio may be calculated using conventional methods available to one of ordinary skill in the art to compare a level of desired signal to a level of background noise (as determined via processing of the audio data). If the signal-to-noise ratio is above a first threshold, then the audio quality may be determined to be good. Alternatively, if the signal-to-noise ratio is between the first threshold and a second threshold, then the audio quality may be determined to be neutral. Alternatively, if the signal-to-noise ratio is below the second threshold, then the audio quality may be determined to be bad.

Similar determinations as discussed above with respect to the signal-to-noise ratio may be made with respect to the signal-to-reverberation ratio. For example, the signal-to-reverberation ratio may be calculated, based on received audio data (e.g., audio data 110). The signal-to-reverberation ratio may be calculated using conventional methods available to one of ordinary skill in the art. If the signal-to-reverberation ratio is above a first threshold, then the audio quality may be determined to be good. Alternatively, if the signal-to-reverberation ratio is between the first threshold and a second threshold, then the audio quality may be determined to be neutral. Alternatively, if the signal-to-reverberation ratio is below the second threshold, then the audio quality may be determined to be bad.

Similar determinations as discussed above with respect to the signal-to-noise ratio and the signal-to-reverberation ratio may be made with respect to the signal-to-interference ratio. For example, the signal-to-interference ratio may be calculated, based on received audio data (e.g., audio data 110). The signal-to-interference ratio be calculated using conventional methods available to one of ordinary skill in the art. If the signal-to-interference ratio is above a first threshold, then the audio quality may be determined to be good. Alternatively, if the signal-to-interference ratio is between the first threshold and a second threshold, then the audio quality may be determined to be neutral. Alternatively, if the signal-to-interference ratio is below the second threshold, then the audio quality may be determined to be bad.

Operation 304 may further include determining a mean opinion score, based on received audio data (e.g., audio data 110). The determination of the mean opinion score differs from the methods of determining the signal-to-noise ratio, signal-to-reverberation ratio, and signal-to-interference ratio in that the mean opinion score based on popular opinion. For example, a mean opinion score may be calculated by providing an audio sample to a plurality of users, and a scale (e.g., a scale from 1 to 5, wherein 1 is the poorest quality, and 5 is the best quality). The plurality of users may assign a number from the scale to the audio sample. Then, the assigned number from each of the plurality of users may be average to calculate the mean opinion score. A machine-learning model may be trained to calculate a mean opinion score for an audio sample, based on data sets wherein audio samples are pre-assigned values from a scale, by a plurality of users. Therefore, if a calculated mean opinion score (e.g., that is determined based on a plurality of users, or that is output from a trained machine-learning model) is above a first threshold, then the audio quality may be determined to be good. Alternatively, if the calculated mean opinion score is between the first threshold and a second threshold, then the audio quality may be determined to be neutral. Alternatively, if the calculated mean opinion score is below the second threshold, then the audio quality may be determined to be bad.

A determination of the audio quality may be based on any one of the signal-to-noise ratio, signal-to-reverberation ratio, signal-to-interference ratio, or mean opinion score. Alternatively, a determination of the audio quality may be based on any combination of the signal-to-noise ratio, signal-to-reverberation ratio, signal-to-interference ratio, and mean opinion score. For example, a weight value may be assigned to each ratio and/or score that is included in the combination, and the ratios and/or score may be factored into one audio quality score that is used to generate a first indicator, based on the assigned weight values. In some examples, methods of determining audio quality that are recognized by those of ordinary skill in the art may be used in addition to, or as an alternative to methods for determining audio quality, as disclosed herein. Accordingly, the first indicator can provide information to a user regarding a quality of received audio (e.g., based on audio data 110).

At operation 306, a first indicator is generated. The first indicator corresponds to the audio of the one or more users. The first indicator may be similar to the first indicator 212, discussed with respect to device 200. For example, the first indicator may be a visual indicator. The first indicator may include a first hue (e.g., green), when the audio quality is above a first threshold. Further, the first indicator may include a second hue (e.g., yellow) when the audio quality is below the first threshold. In some examples, a plurality of first indicators may be generated that each correspond to audio of a respective one of a plurality of users.

At operation 308, a user-input is received. The user input may be received via a user-interface of an audio communication device (e.g., the user-interface 206). For example, a user may select (via their finger, a stylus, a button, an input device, etc.) a portion of the user-interface to provide the user-input to the device. Additionally, or alternatively, the user-input may be received via a communication network, such as, for example, network 108, discussed with respect to FIG. 1. In some examples, a plurality of user-inputs may be received. Each of the plurality of user-inputs may correspond to a region of the audio communication device that is desired to be muted.

At determination 310, it is determined whether the user-input has an associated muting command. For example, if a portion of a user-interface of a device is selected, then a muting command may be determined that corresponds to a region, or quadrant, or section of the device within which the portion of the user-interface that is selected is disposed.

If it is determined that there is not a muting command associated with the user-input, flow branches "NO" to operation 312, where a default action is performed. For example, the received user-command may have an associated pre-configured action. In some examples, the method 300 may comprise determining whether the user-input has an associated default action, such that, in some instances, no action may be performed as a result of the received user-input. Method 300 may terminate at operation 312. Alternatively, method 300 may return to operation 302, from operation 310, to create a continuous feedback loop of receiving audio data and a user-input, and determining whether the received user-input has an associated muting command.

If however, it is determined that there is a muting command associated with the user-input, flow instead branches "YES" to operation 314, where a region of an audio communication device is muted, based on the user-input. For example, if one or more microphones are disposed within a region of the device, as indicated by the user-input, then the one or more of the microphones may be turned off, or a gain of the one or more of the microphones may be reduced (e.g., by 25%, 50%, 75%, 99%, etc.). Additionally, or alternatively, digital processing (e.g., active noise-cancelling, or another form of noise-cancelling) may be performed on audio that is received by the one or more microphones to mute the region of the device that corresponds to the user-input.

Flow advances to operation 316, where a second indicator is generated. The second indicator corresponds to the muted region. The second indicator may be similar to the second indicator 214, discussed with respect to device 200. In some examples, the second indicator may be generated such that it replaces at least a portion of the first indicator. Further, in examples where a plurality of user-inputs are received, the generating of the second indicator may include generating a plurality of second indicators that each replace at least a portion of the first indicator. The second indicator may be a visual indicator that include a hue, such as red. The hue of the second indicator may be different than the hue (or plurality of hues) of the first indicator to provide an indication to a user regarding which portions of the device are muted, and which portions are not muted.

Method 300 may terminate at operation 316. Alternatively, method 300 may return to operation 302, from operation 316. The plurality of indications may provide information regarding audio quality from one or more users, as well as which regions of an audio communication device may be muted.

Figure 4A:
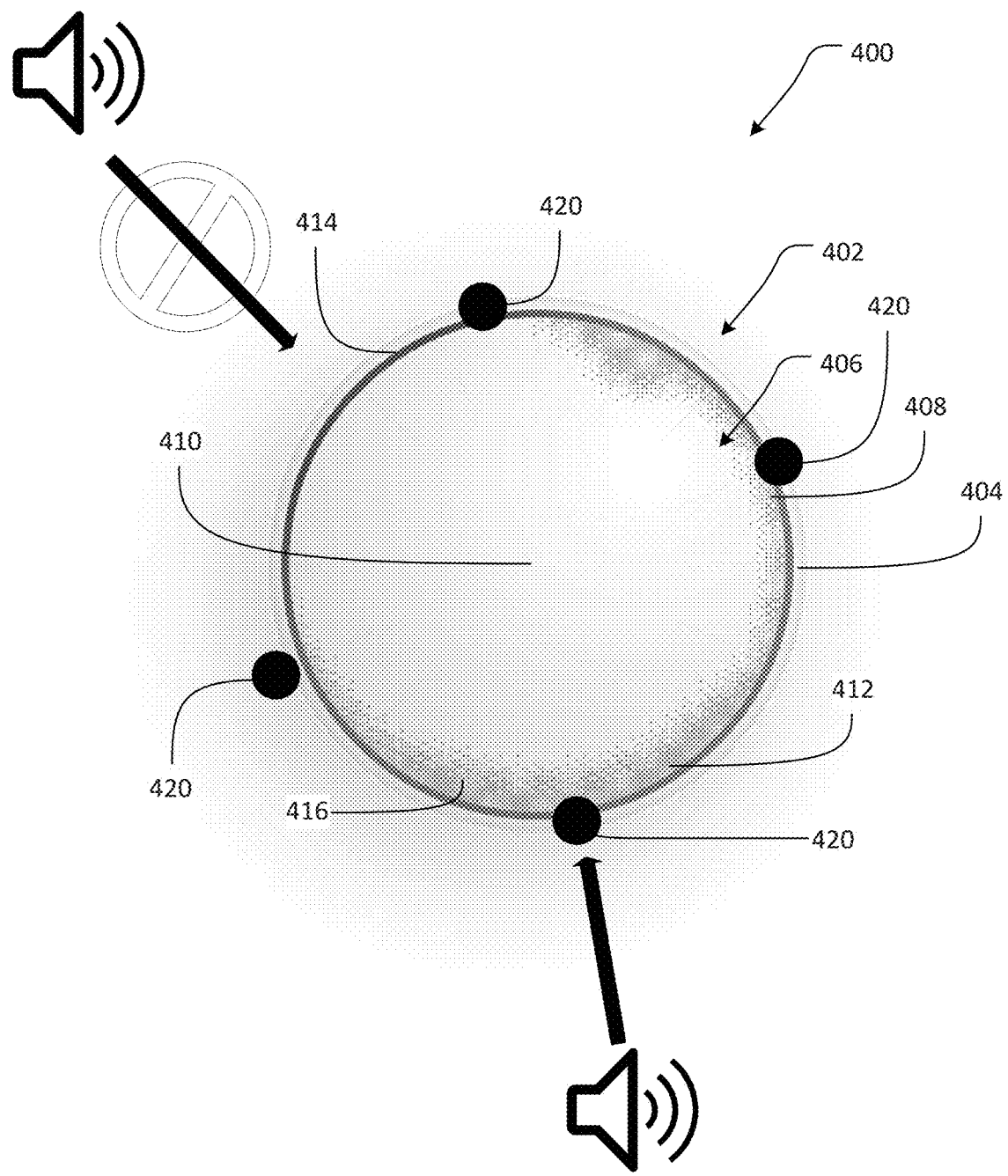
FIG. 4A illustrates an overview of an example audio communication device with novel visual indications and adjustable muting, according to aspects described herein.
Figure 4B:
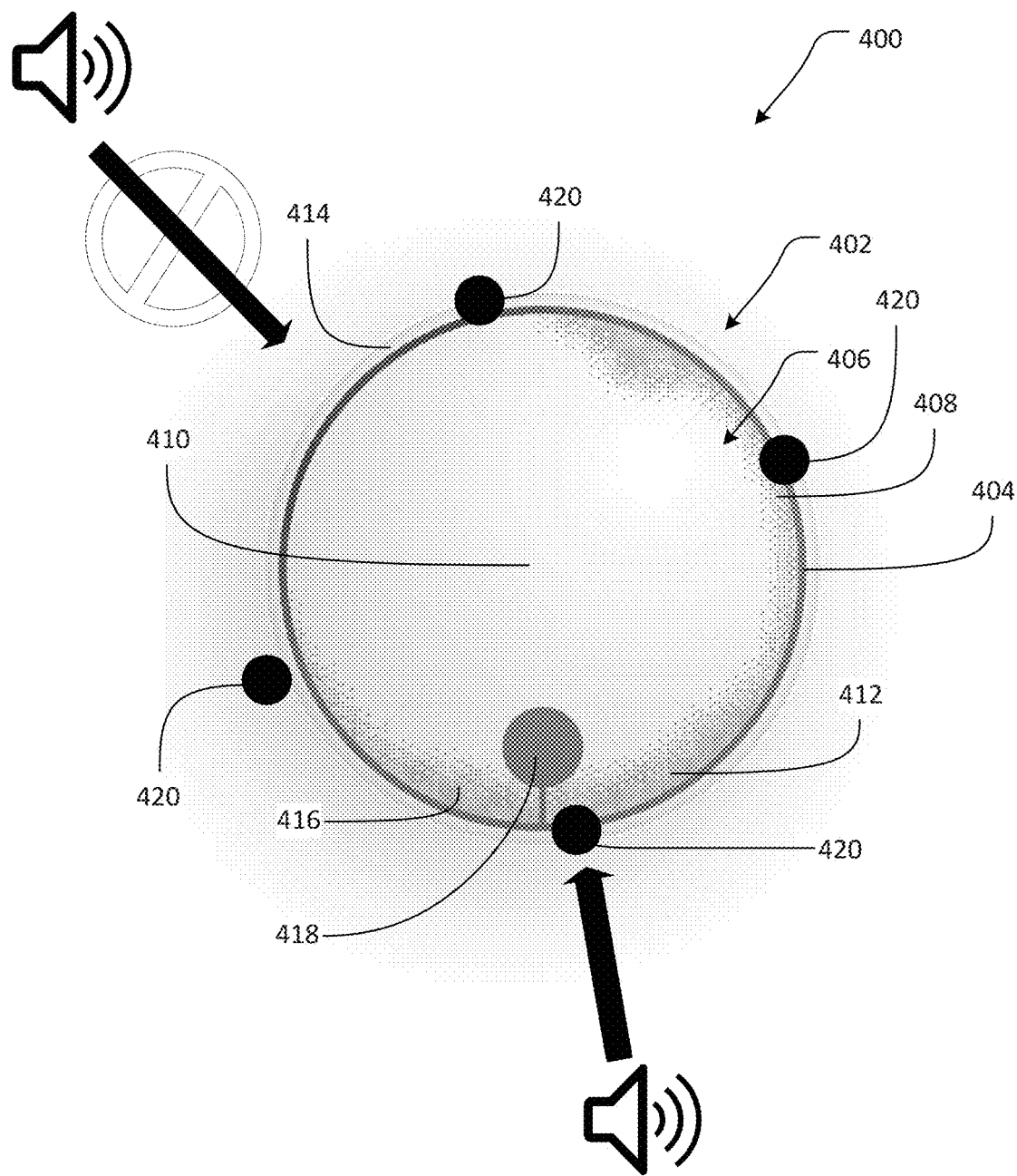
FIG. 4B illustrates an overview of an example audio communication device with novel visual indications and adjustable muting, according to aspects described herein.
Figure 4C:
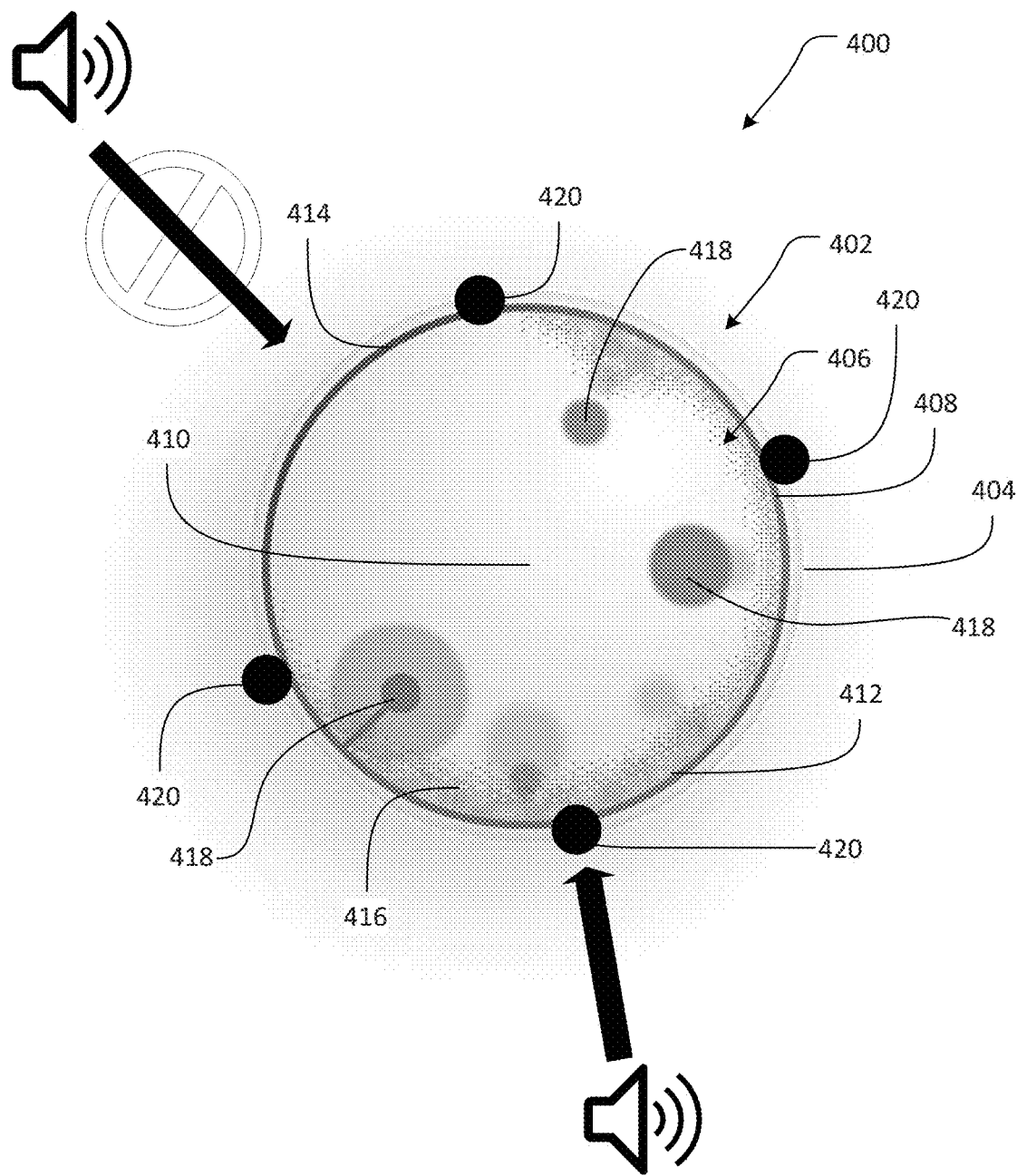
FIG. 4C illustrates an overview of an example audio communication device with novel visual indications and adjustable muting, according to aspects described herein.

FIGS. 4A-4C illustrate an overview of an example audio communication device or device 400 with novel visual indications and adjustable muting, according to aspects described herein. The device 400 may be similar to computing device 102 (e.g., the device 400 may include the communication system 112, the visualization component 114, and or the adjustable muting component 116). Further, the device 400 may be similar to the audio communication device 200, discussed with respect to FIGS. 2A and 2B, in some aspects. The device 400 may also be different from the audio communication device 200, in some aspects.

As shown in FIGS. 4A, 4B, and 4C, the device 400 includes a body 402. The body 402 includes a base 404 and a user-interface 406. The base 404 may define a plane extending thereacross (e.g., parallel to the page). The user-interface 406 may be disposed on a surface of the body 402 that is opposite from the base 404. In alternative examples, the user-interface 406 may be disposed on a surface of the body 402 that is adjacent to the base 404. The body 402 may be generally cylindrical. Alternatively, the body 402 may be cubical, prismatic, or any other shape. Accordingly, the base 404 may be circular, ovular, rectangular, square, or any other polygonal shape. The body 402 may define a peripheral edge 408, and a center point 410. The peripheral edge 408 may extend around the user-interface 406. Further, the center point 410 may be the geometric center point of the user-interface 406. In the illustrated examples of FIGS. 4A-4C, the center point 410 may define a central axis extending through the body (e.g., orthogonally into the page), around which the body 402 and/or the user-interface 406 is disposed symmetrically (e.g., radial-symmetrically).

In some examples, the user-interface 406 may be a display screen with user-interface capabilities (e.g., touch screen with a graphical user-interface, buttons, sliders, keyboard-input, mouse-input, etc.). Additionally, or alternatively, the user-interface 406 may include a plurality of buttons, a plurality of sliders, a plurality of lights, and/or a combination thereof. Further orientations of user-interface capabilities, and/or components that may be incorporated in a user-interface will be apparent to those of ordinary skill in the art.

The user-interface 406 may include a plurality of indicators, such as a first indicator 412, a second indicator 414, a third indicator 416, and a fourth indicator 418. In the example device of FIGS. 4A-4C, the first, second, third, and fourth indicators 412, 414, 416, and 418 are visual indicators. However, it is also considered that the plurality of indicators could additionally, or alternatively, be audio indicators (e.g., that each have unique sounds or patterns to differentiate between the different indicators).

The device 400 may further include one or more microphones 420 that receive audio to produce audio data (e.g., audio data 110). The one or more microphones 420 may be a plurality of microphones 420. The plurality of microphones 420 may be disposed along, and/or adjacent to, the peripheral edge 408 of the device body 402. The one or more microphones 420 may be omnidirectional microphones. Additionally, or alternatively, the one or more microphones 420 may be directional microphones. In some examples, the one or more microphones 420 are omnidirectional microphones that are configured to function as directional microphones, as a result of digital signal processing techniques that are trained based on trained models (e.g., neural networks or other machine-learning models) to pick up sound from a polar direction, or range of polar directions (e.g., sound may be picked up from any direction within one or more specified angular ranges along the peripheral edge 408, as measured around the center point 410).

Referring now to the first indicator 412, the first indicator 412 may be similar to the first indicator 212. For example, the first indicator 412 may correspond to if a region of the audio communication device 400 is actively receiving audio to be transmitted (i.e., the region is not muted). On the example device 400, the first indicator 412 is shown to extend along the peripheral edge 408 of the body 402 of the device 400. The first indicator 412 can include one or more hues. For example, referring specifically to FIGS. 4A-4C, the first indicator 412 is green to indicate to a user that audio is being received along a region of the device 400 that the first indicator 412 is extending thereacross.

Referring now to the second indicator 414, the second indicator 414 may be similar to the second indicator 214. For example, the second indicator 414 may correspond to if a region of the device 400 is not actively receiving audio, or whether audio that is received within the region is being filtered (i.e., the region is muted). For example, if one or more of the microphones 420 are disposed within a region of the device 400, as indicated by the second indicator 414, then the one or more of the microphones 420 may be turned off, or a gain of the one or more of the microphones 420 may be reduced (e.g., by 25%, 50%, 75%, 99%, etc.). Additionally, or alternatively, digital processing (e.g., active noise-cancelling, or another form of noise-cancelling) may be performed on audio that is received by the one or more microphones 420 to mute the region of the device 400 indicated by the second indicator 414.

The second indicator 414 may be generated based on user-input. For example, with respect to FIGS. 4A-4C, a user may select (via their finger, a stylus, a button, an input device, etc.) a portion of the user-interface 406 (e.g., along the periphery edge 408). The portion of the user-interface 406 that is selected (e.g., a portion along the periphery edge 408), based on the user-input, may then display the second indicator 414. In some examples, the second indicator 414 may replace at least a portion of the first indicator 416. In other examples, the second indicator 414 may be provided adjacent to, or otherwise in addition to, the first indicator 416. The second indicator 414 may be a visual indicator that include a hue, such as red. The hue of the second indicator 414 may be different than the hue (or plurality of hues) of the first indicator 416 to provide an indication to a user regarding which portions of the device 400 are muted, and which portions are not muted.

As discussed above, the second indicator 414 can be generated based on user-input, depending on from which directions a user would like for audio to be muted. Additionally, or alternatively, a gain of noise-cancelling digital processing that is performed on audio can be adjustable, based on the user-input. For example, if the user-input is provided via a button or touchscreen, then the gain of noise-cancelling digital processing can correspond to how many times the button or touchscreen is clicked or tapped. With one click/tap, audio that is received along a region indicated by the second visual indicator 414 may be reduced by 50%. With two clicks/taps, audio that is received along the region may be reduced by 75%. With three click/taps, audio that is received along the region may be fully muted (i.e., reduced by 100%). With four clicks/taps, audio that is received along the region may be un-muted, and the second indicator 414 may be replaced by the first indicator 412 to indicate that the region is now un-muted. Further configurations or implementations for adjusting a gain of noise-cancelling digital processing in coordination with aspects of the present disclosure may be recognized by those of ordinary skill in the art.

The base 404 of the device 400 may generally define a compass, wherein the angles of the compass are distributed along the peripheral edge 408, about the center point 410 of the device 400. A direction corresponding to noise that is filtered out by the muted region of the device 400 (as indicated by the second indicator 414) may correspond to the direction along which a polar vector extends, from the geometric center of the base, through the muted region, to a source of the noise that is desired to be filtered out by the muted region.

While the example device 400 illustrated in FIGS. 4A-4C shows one first indicator 412 and one second indicator 414, it is also possible that there may be a plurality of first indicators 412 and a plurality of second indicators 414, such as in instances where regions of the device 400 alternate between muted and un-muted. Further, in some examples, there may be a plurality of users disposed around the device 400 who may each have different preferences regarding whether the region of the device 400 corresponding to the direction in which they are disposed is muted or un-muted. Accordingly, the device 400 may receive a plurality of user-inputs that each correspond to a respective one of the plurality of users to generate first and second indicators 412, 414, based on the user-inputs.

Referring now to the third indicator 416, the third indicator 416 may correspond to ambient or background noise that is received by the device 400. The ambient or background noise may be identified using conventional techniques, such as digital signal processing that is trained, via a trained model, to determine whether audio signals belong to a focal person who is speaking, or whether audio signals correspond to background noise (e.g., traffic, nearby meetings, animal noises, etc.).

The third indicator 416 may provide information to a user regarding a noise level of ambient noise that is received by the device 400 (e.g., based on audio data, such as audio data 110). For example, a height of the third indicator 416 may be adjusted based on a noise level of audio that is received by the device 400. If the noise level increases, then a height of the third indicator 416 (e.g., as measured from peripheral edge 408 to the center point 410) may increase. Alternatively, if the noise level decreases, then the height of the third indicator 416 may decrease. Further, the third indicator 416 may provide information to a user regarding a direction from which ambient noise is being received (e.g., based on audio data, such as audio data 110). For example, the third indicator 416 may be generally angled about the center point 410 in the same direction in which audio is received at the device 400. Determining a direction from which audio is received may be based on any conventional method known to those of ordinary skill in the art.

Generally, the third indicator 416 may provide a visualization that informs a user of ambient noise that may disrupt audio quality of a call, such that corrective action can be taken. Such corrective action can include, muting a region of the device 400 that is shown to be receiving a relatively high amount of ambient noise. Additionally, or alternatively, the corrective action can include taking action to reduce or eliminate the source of the ambient noise (e.g., moving the device 400 into a quieter environment, asking people nearby to quiet down, moving animals into a different environment than that in which the device 400 is located, etc.).

Referring now to the fourth indicator 418, the fourth indicator 418 may correspond to audio of one or more users that is received by the device 400 (e.g., one or more users who are on a call, and speaking into the device 400). The one or more users may be identified using conventional techniques, such as digital signal processing that is trained, via a trained model, to determine whether audio signals belong to one or more focal people who are speaking, or whether audio signals correspond to background noise (e.g., traffic, nearby meetings, animal noises, etc.).

The fourth indicator 418 may provide information to a user regarding a noise level of audio of one or more users that is received by the device 400 (e.g., based on audio data, such as audio data 110). For example, a height of the fourth indicator 418 may be adjusted based on a noise level of audio that is received by the device 400. If the noise level increases, then a height of the fourth indicator 418 (e.g., as measured from peripheral edge 408 to the center point 410) may increase. Alternatively, if the noise level decreases, then the height of the fourth indicator 418 may decrease. In some examples, a size of the fourth indicator 418 may be adjusted, based on the noise level of audio that is received, corresponding to the one or more users. The size of the fourth indicator may be enlarged, when the noise level of a corresponding user is increase. Alternatively, the size of the fourth indicator may be reduced, when the noise level of a corresponding user is decreased.

Further, the fourth indicator 418 may provide information to a user regarding a direction from which audio of one or more users is being received (e.g., based on audio data, such as audio data 110). For example, referring back to the compass description above, the fourth indicator 418 may be disposed at an angle around the center point 410 of the device 400. The angle at which the fourth indicator 418 is disposed, may be the direction from which the source of the user audio, to which the fourth indicator corresponds, originates. It will be appreciated that methods of determining a direction from which audio is received may be recognized by those of ordinary skill in the art.

Generally, the fourth indicator 418 may provide a visualization that informs a user of from where, and how loud, audio from one or more users are being received by the device 400. Furthermore, the combination of the fourth indicator 418 and the third indicator 416 may provide information to a user regarding whether or not ambient noise may be interfering with audio that is received from one or more users, such that corrective action can be taken (as described earlier herein). In some examples, one of the third indicator 416 and the fourth indicator 418 are capable of overlaying the other of the third indicator 416 or the fourth indicator 418 (e.g., an indication corresponding to ambient noise may overlay an indication corresponding to audio from a user, or vice-versa). The overlay of the third and fourth indicators 416, 418 can provide an indication to a user of a potential disturbance of ambient noise on audio quality of one or more users.

Figure 5:
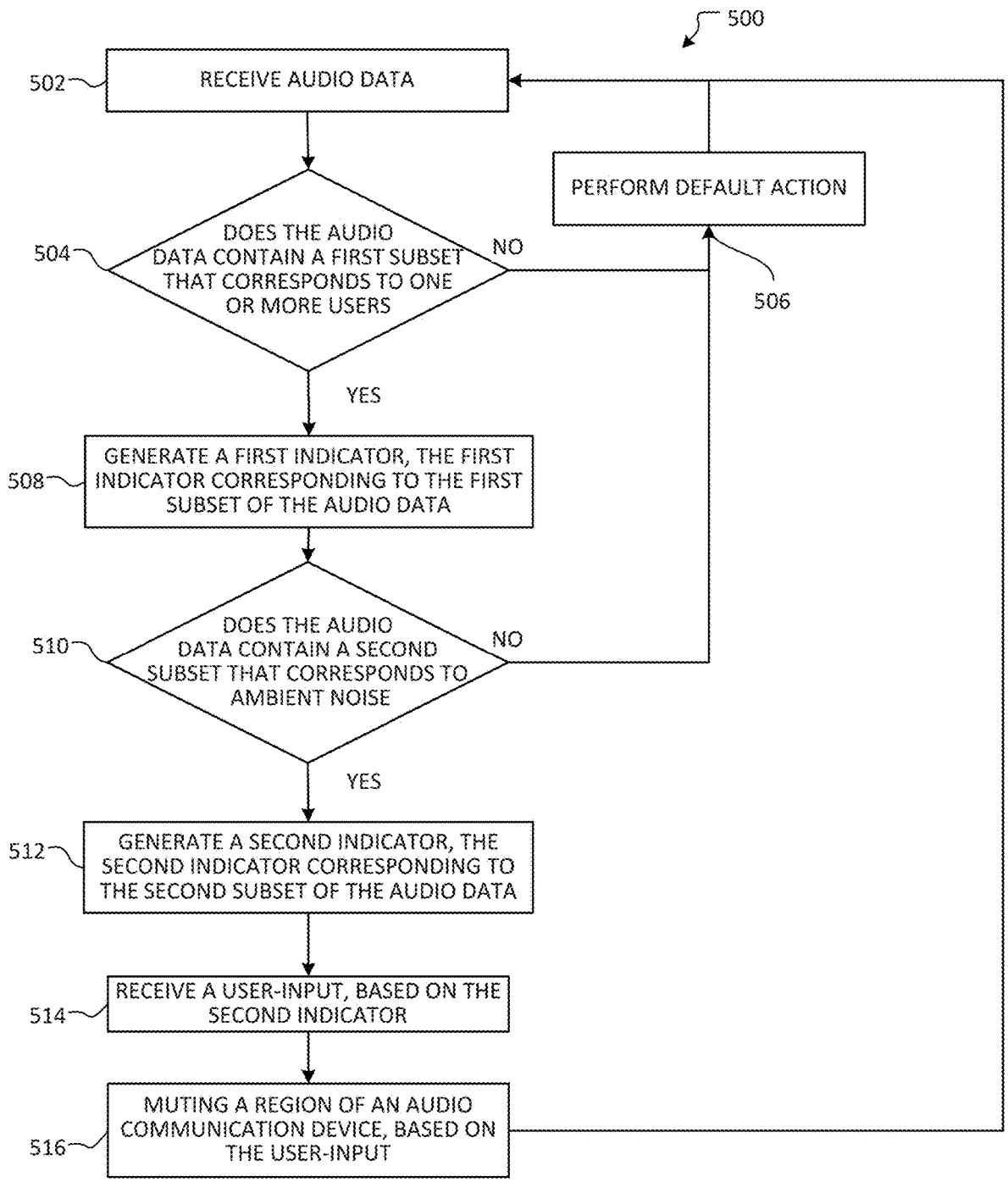
FIG. 5 illustrates an overview of an example method for generating novel visual indications and muting regions of an audio communication device, according to aspects described herein.

FIG. 5 illustrates an overview of an example method 500 for generating novel visual indications and muting regions of an audio communication device, according to aspects described herein. In examples, aspects of method 500 are performed by computing device 102, server 104, and/or device 400 discussed above with respect to FIGS. 1 and 4A-4C.

Method 500 begins at operation 502, wherein audio data (e.g., audio data 110) is received. The audio data may correspond to audio of one or more users. The audio data may further correspond to ambient noise (e.g., traffic, nearby meetings, animal sounds, etc.). The audio data may be generated by one or more microphones (e.g., microphones 420) that receive noise from an environment and generate audio data, based on the noise, for further processing (e.g., by a processor). Additionally, or alternatively, the audio data may be received from a server (e.g., server 104), or a computing device (e.g., computing device 102) that is remote from a location at which the audio data is received.

At determination 504, it is determined whether the audio data contains a first subset that correspond to one or more users. For example, audio data may comprise a plurality of signals or bytes that can be cleaned or classified or organized, based on objects to which the signals or bytes correspond. In some aspects, a trained machine-learning model, such as a neural network, may be used to identify the first subset of audio data that corresponds to one or more users. Additionally, or alternatively, identifying characteristics of one or more users' audio may be stored in memory (e.g., tone, pitch, volume, etc.), and the determination 504 may be a comparison between received audio data, and the identifying characteristics of one or more users' audio to classify data as corresponding to the one or more users, or not (based on a margin of error).

If it is determined that there is not a first subset of the audio data that corresponds to one or more users, flow branches "NO" to operation 506, where a default action is performed. For example, the audio data may have an associated pre-configured action. In some examples, the method 500 may comprise determining whether the audio data has an associated default action, such that, in some instances, no action may be performed as a result of the received audio data. Method 500 may terminate at operation 506. Alternatively, method 500 may return to operation 502, from operation 504, to create a continuous feedback loop of receiving audio data and determining whether the audio data contains a first subset that corresponds to one or more users.

If however, it is determined that there is a first subset of the audio data that corresponds to one or more users, flow instead branches "YES" to operation 508, where a first indicator is generated. The first indicator corresponds to the first subset of the audio data. The first indicator of operation 508 may be similar to the fourth indicator 418, discussed with respect to device 400. For example, the first indicator may provide information to a user regarding a noise level of audio of one or more users that is received by a device (e.g., device 400). Further, the first indicator may provide information to a user regarding a direction from which audio of one or more users is being received. Generally, the first indicator may provide a visualization that informs a user of from where, and how loud, audio from one or more users are being received by a device (e.g., device 400).

At determination 510, it is determined whether the audio data contains a second subset that correspond to ambient noise. For example, audio data may comprise a plurality of signals or bytes that can be cleaned or classified or organized, based on objects to which the signals or byes correspond. In some aspects, a trained machine-learning model, such as a neural network, may be used to identify the second subset of audio data that corresponds to ambient noise. Additionally, or alternatively, identifying characteristics of ambient noise may be stored in memory (e.g., tone, pitch, volume, etc.), and the determination 504 may be a comparison between received audio data, and the identifying characteristics of ambient noise to classify data as corresponding to ambient noise, or not (based on a margin of error). In some examples, the second subset of audio data may be all of the audio data that is not part of the first subset of audio data.

If it is determined that there is not a second subset of the audio data that corresponds to ambient noise, flow branches "NO" to operation 506, where a default action is performed. For example, the audio data may have an associated pre-configured action. In some examples, the method 500 may comprise determining whether the audio data has an associated default action, such that, in some instances, no action may be performed as a result of the received audio data. Method 500 may terminate at operation 506. Alternatively, method 500 may return to operation 502, from operation 510, to create a continuous feedback loop of receiving audio data, generating a first indicator, and determining whether the audio data contains a second subset that corresponds ambient noise.

If however, it is determined that there is a second subset of the audio data that corresponds to ambient noise, flow instead branches "YES" to operation 512, where a second indicator is generated. The second indicator corresponds to the second subset of the audio data. The second indicator of operation 512 may be similar to the third indicator 416, discussed with respect to device 400. For example, the second indicator may provide information to a user regarding a noise level (e.g., volume level, such as decibels) of ambient noise that is received by a device (e.g., device 400) Further, the second indicator may provide information to a user regarding a direction from which ambient noise is being received. Generally, the third indicator 416 may provide a visualization that informs a user of ambient noise that may disrupt audio quality of a call, such that corrective action can be taken.

At operation 514, a user-input is received, based on the second indicator. The user-input may be received in a similar manner as discussed earlier herein, with respect to devices 200 and 400. For example, the user-input may be received via a user-interface (e.g., user-interface 206, 406) that includes a touchscreen, and/or buttons, and/or sliders, and/or input devices, etc. In some examples, such as the example device 200, 400, the user-input may be a finger or stylus that is tapped and/or dragged along the user-interface, adjacent to a peripheral edge of the audio communication device. Alternatively, in some examples, a button may be pushed, or a slider may be slid to provide user-input to a device, such as to adjust muting corresponding to a region (e.g., quadrant, angular section, etc.) of the device. Generally, a user may choose to adjust muting in a region that is known to have an undesirable amount of ambient noise (e.g., as indicated by the second indicator of operation 512). Accordingly, the indication of operation 512, and/or operation 508, may ease the ability for a user to selectively mute regions of a device (e.g., device 400) to improve audio quality (e.g., by removing undesired ambient noise).

At operation 516, a region of the audio communication device is muted, based on the user-input. For example, referring again to the finger or stylus being dragged along a peripheral edge of the device, an audio that is received along that peripheral edge, may be filtered out or muted using digital signal processing. Alternatively, if buttons or sliders are disposed within quadrants or sectors (e.g., sectors that are symmetrically, or asymmetrically, divided around a center point of the device, such as center point 410), then if a user presses the button, or slides the slider, audio that is received, corresponding to the quadrant or sector in which the button or slider is disposed, may be filtered or muted, fully or partially. For example, if one or more of microphones correspond to the quadrant or region in which a user-interface component is disposed (e.g., button, slider, touchscreen, etc.), then the one or more of the microphones may be turned off, or a gain of the one or more of the microphones may be reduced (e.g., by 25%, 50%, 75%, 99%, etc.). Additionally, or alternatively, digital processing (e.g., active noise-cancelling, or another form of noise-cancelling) may be performed on audio that is received by the one or more microphones to mute the relevant quadrant or sector of the audio communication device.

Method 500 may terminate at operation 516. Alternatively, method 500 may return to operation 502, from operation 516. The combination of the first indicator (of operation 508) and the second indicator (of operation 512) may provide information to a user regarding whether or not ambient noise may be interfering with audio that is received from one or more users, such that corrective action can be taken (e.g., muting one or more regions of an audio communication device, as discussed with respect to operation 516). In some examples, one of the first indicator and the second indicator are capable of overlaying the other of the first indicator or the second indicator (e.g., an indication corresponding to ambient noise may overlay an indication corresponding to audio from a user, or vice-versa). The overlay of the first and second indicators can provide an easy visual indication to a user of a potential disturbance of ambient noise on audio quality of one or more users.

Figure 6A:
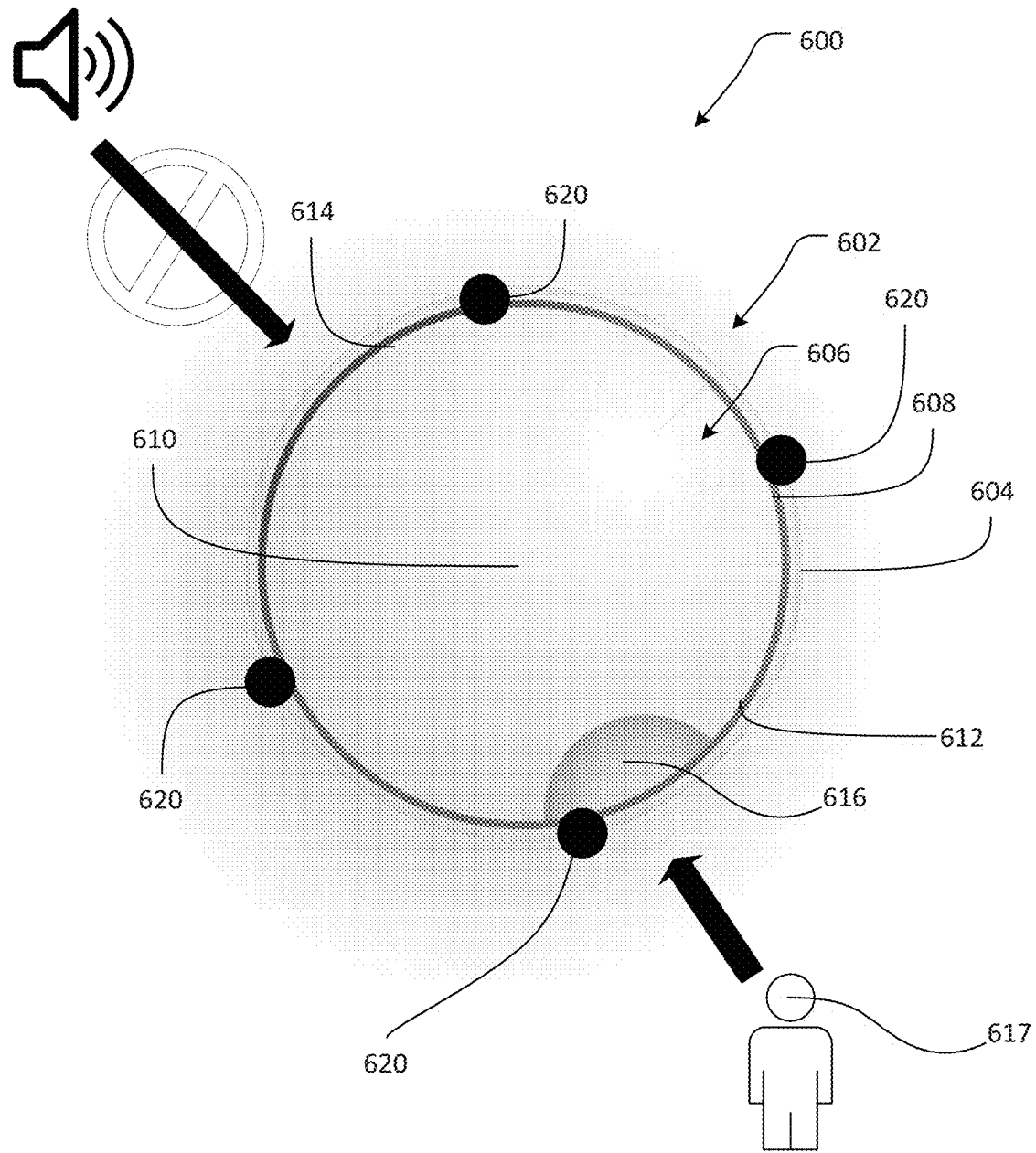
FIG. 6A illustrates an overview of an example audio communication device with novel visual indications and adjustable muting, according to aspects described herein.
Figure 6B:
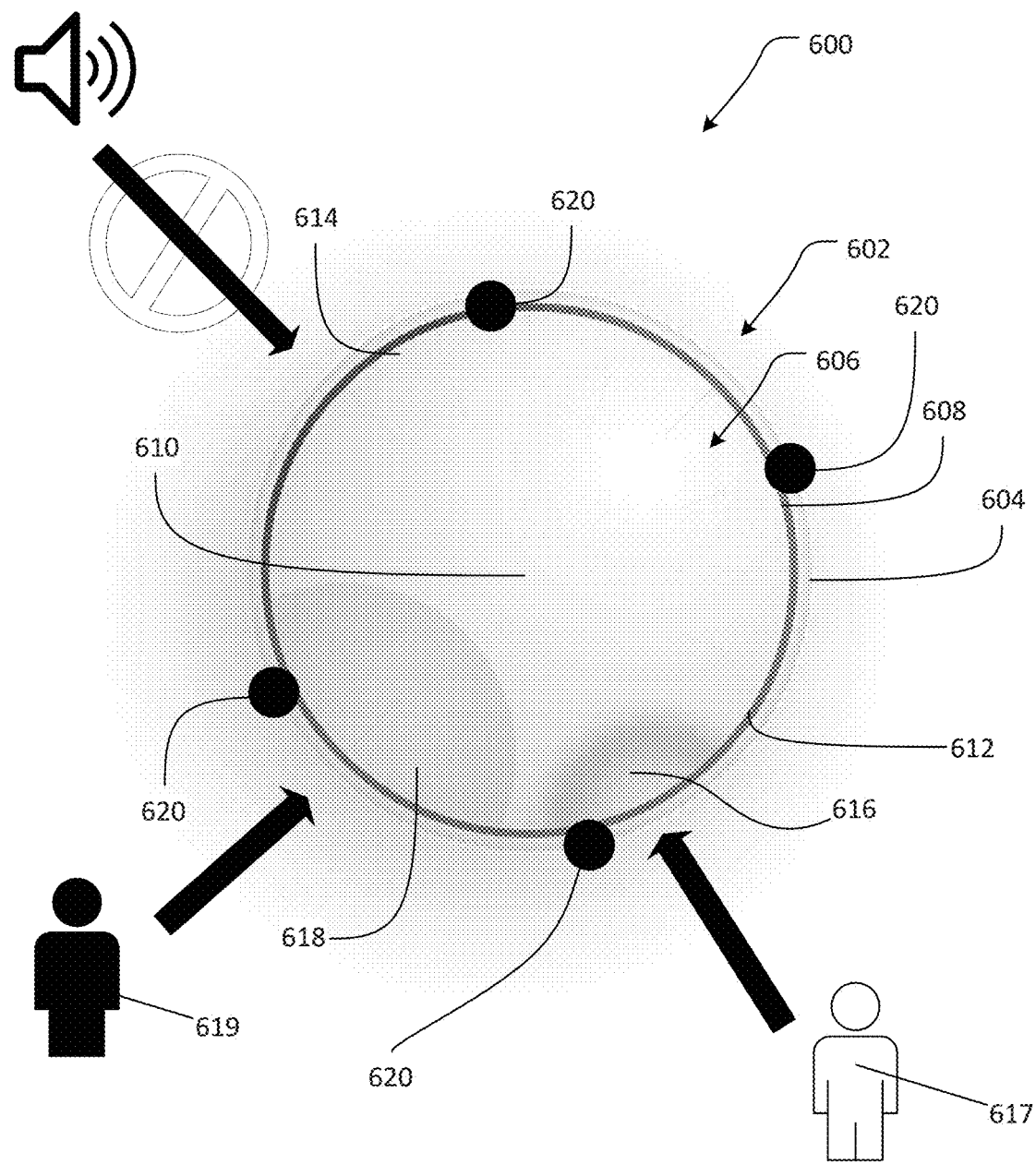
FIG. 6B illustrates an overview of an example audio communication device with novel visual indications and adjustable muting, according to aspects described herein.
Figure 6C:
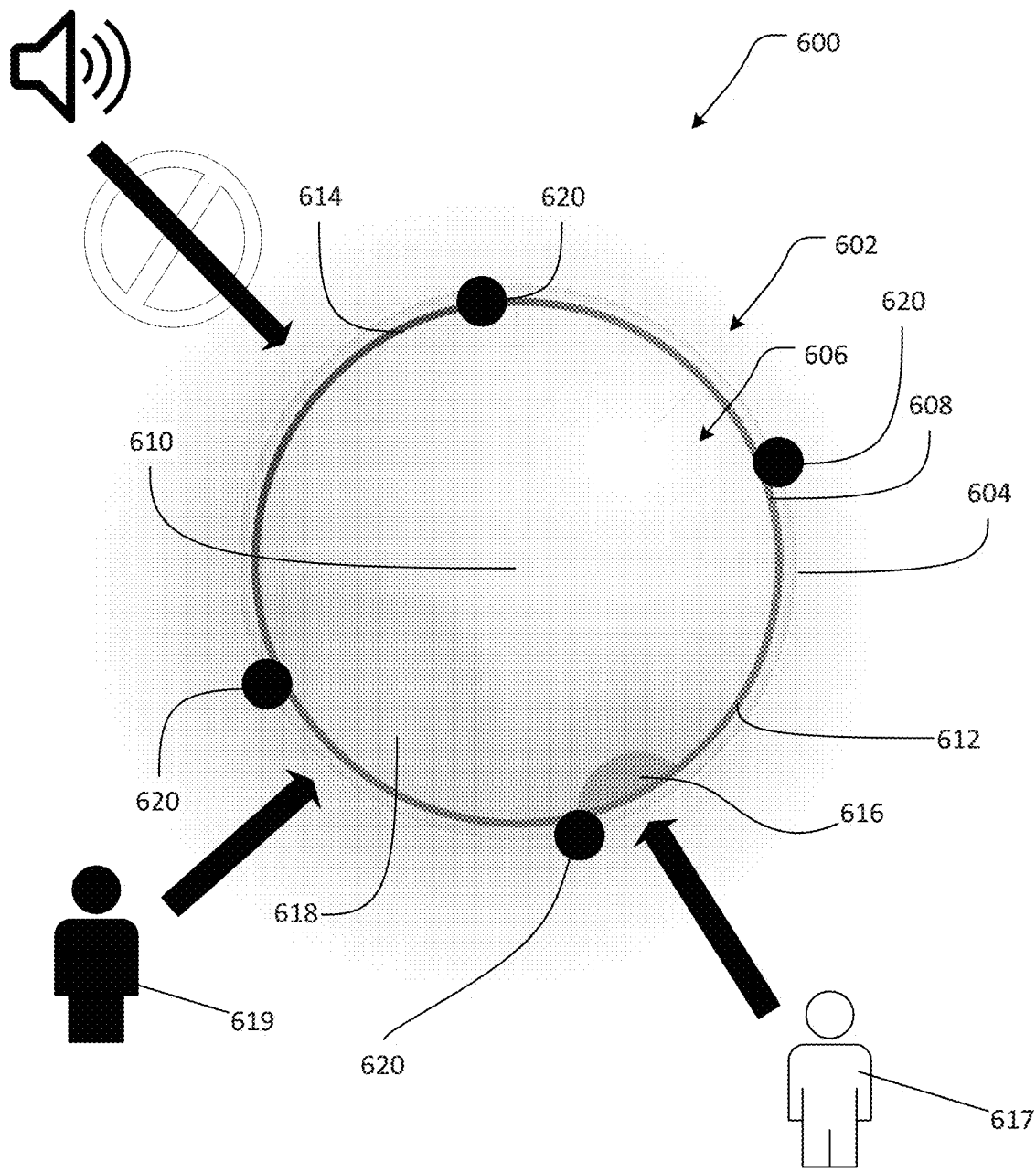
FIG. 6C illustrates an overview of an example audio communication device with novel visual indications and adjustable muting, according to aspects described herein.

FIGS. 6A-6C illustrate an overview of an example audio communication device 600 with novel visual indication and adjustable muting, according to aspects described herein. The device 600 may be similar to computing device 102 (e.g., the device 400 may include the communication system 112, the visualization component 114, and or the adjustable muting component 116). Further, the device 600 may be similar to the audio communication devices 200, 400 discussed with respect to FIGS. 2A, 2B, and 4A-4C, in some aspects. The device 400 may also be different from the audio communication devices 200, 400, in some aspects.

As shown in FIGS. 6A, 6B, and 6C, the device 600 includes a body 402. The body 602 includes a base 604 and a user-interface 606. The base 604 may define a plane extending thereacross (e.g., parallel to the page). The user-interface 606 may be disposed on a surface of the body 602 that is opposite from the base 604. In alternative examples, the user-interface 606 may be disposed on a surface of the body 602 that is adjacent to the base 604. The body 602 may be generally cylindrical. Alternatively, the body 602 may be cubical, prismatic, or any other shape. Accordingly, the base 604 may be circular, ovular, rectangular, square, or any other polygonal shape. The body 602 may define a peripheral edge 608, and a center point 610. The peripheral edge 608 may extend around the user-interface 606. Further, the center point 610 may be the geometric center point of the user-interface 606. In the illustrated examples of FIGS. 6A-6C, the center point 610 may define a central axis extending through the body (e.g., orthogonally into the page), around which the body 602 and/or the user-interface 606 is disposed symmetrically (e.g., radial-symmetrically).

In some examples, the user-interface 606 may be a display screen with user-interface capabilities (e.g., touch screen with a graphical user-interface, buttons, sliders, keyboard-input, mouse-input, etc.). Additionally, or alternatively, the user-interface 606 may include a plurality of buttons, a plurality of sliders, a plurality of lights, and/or a combination thereof. Further orientations of user-interface capabilities, and/or components that may be incorporated in a user-interface will be apparent to those of ordinary skill in the art.

The user-interface 606 may include a plurality of indicators, such as a first indicator 612, a second indicator 614, a third indicator 616, and a fourth indicator 618. In the example device 600 of FIGS. 6A-6C, the first, second, third, and fourth indicators 612, 614, 616, and 618 are visual indicators. However, it is also considered that the plurality of indicators could additionally, or alternatively, be audio indicators (e.g., that each have unique sounds or patterns to differentiate between the different indicators).

The device 600 may further include one or more microphones 620 that receive audio to produce audio data (e.g., audio data 110). The one or more microphones 620 may be a plurality of microphones 620. The plurality of microphones 620 may be disposed along, and/or adjacent to, the peripheral edge 608 of the device body 602. The one or more microphones 620 may be omnidirectional microphones. Additionally, or alternatively, the one or more microphones 620 may be directional microphones. In some examples, the one or more microphones 620 are omnidirectional microphones that are configured to function as directional microphones, as a result of digital signal processing techniques that are trained based on trained models (e.g., neural networks or other machine-learning models) to pick up sound from a polar direction, or range of polar directions (e.g., sound may be picked up from any direction within one or more specified angular ranges along the peripheral edge 608, as measured around the center point 610).

Referring now to the first indicator 612, the first indicator 612 may be similar to the first indicators 212, 412. For example, the first indicator 612 may correspond to if a region of the audio communication device 600 is actively receiving audio to be transmitted (i.e., the region is not muted). On the example device 600, the first indicator 612 is shown to extend along the peripheral edge 608 of the body 602 of the device 600. The first indicator 612 can include one or more hues. For example, referring specifically to FIGS. 4A-4C, the first indicator 612 is green to indicate to a user that audio is being received along a region of the device 600 that the first indicator 612 is extending thereacross.

Referring now to the second indicator 614, the second indicator 614 may be similar to the second indicators 214, 414. For example, the second indicator 614 may correspond to if a region of the device 600 is not actively receiving audio, or whether audio that is received within the region is being filtered (i.e., the region is muted). For example, if one or more of the microphones 620 are disposed within a region of the device 400, as indicated by the second indicator 614, then the one or more of the microphones 620 may be turned off, or a gain of the one or more of the microphones 620 may be reduced (e.g., by 25%, 50%, 75%, 99%, etc.). Additionally, or alternatively, digital processing (e.g., active noise-cancelling, or another form of noise-cancelling) may be performed on audio that is received by the one or more microphones 620 to mute the region of the device 600 indicated by the second indicator 614.

The second indicator 614 may be generated based on user-input. For example, with respect to FIGS. 6A-6C, a user may select (via their finger, a stylus, a button, an input device, etc.) a portion of the user-interface 606 (e.g., along the periphery edge 608). The portion of the user-interface 606 that is selected (e.g., a portion along the periphery edge 608), based on the user-input, may then display the second indicator 614. In some examples, the second indicator 614 may replace at least a portion of the first indicator 616. In other examples, the second indicator 614 may be provided adjacent to, or otherwise in addition to, the first indicator 616. The second indicator 614 may be a visual indicator that include a hue, such as red. The hue of the second indicator 614 may be different than the hue (or plurality of hues) of the first indicator 616 to provide an indication to a user regarding which portions of the device 600 are muted, and which portions are not muted.

As discussed above, the second indicator 614 can be generated based on user-input, depending on from which directions a user would like for audio to be muted. Additionally, or alternatively, a gain of noise-cancelling digital processing that is performed on audio can be adjustable, based on the user-input. For example, if the user-input is provided via a button or touchscreen, then the gain of noise-cancelling digital processing can correspond to how many times the button or touchscreen is clicked or tapped. With one click/tap, audio that is received along a region indicated by the second visual indicator 414 may be reduced by 50%. With two clicks/taps, audio that is received along the region may be reduced by 75%. With three click/taps, audio that is received along the region may be fully muted (i.e., reduced by 100%). With four clicks/taps, audio that is received along the region may be un-muted, and the second indicator 614 may be replaced by the first indicator 612 to indicate that the region is now un-muted. Further configurations or implementations for adjusting a gain of noise-cancelling digital processing in coordination with aspects of the present disclosure may be recognized by those of ordinary skill in the art.

The base 604 of the device 600 may generally define a compass, wherein the angles of the compass are distributed along the peripheral edge 608, about the center point 610 of the device 600. A direction corresponding to noise that is filtered out by the muted region of the device 600 (as indicated by the second indicator 614) may correspond to the direction along which a polar vector extends, from the geometric center of the base, through the muted region, to a source of the noise that is desired to be filtered out by the muted region.

While the example device 600 illustrated in FIGS. 6A-6C shows one first indicator 612 and one second indicator 614, it is also possible that there may be a plurality of first indicators 612 and a plurality of second indicators 614, such as in instances where regions of the device 600 alternate between muted and un-muted. Further, in some examples, there may be a plurality of users disposed around the device 600 who may each have different preferences regarding whether the region of the device 600 corresponding to the direction in which they are disposed is muted or un-muted. Accordingly, the device 600 may receive a plurality of user-inputs that each correspond to a respective one of the plurality of users to generate first and second indicators 612, 614, based on the user-inputs.

Referring now to the third indicator 616, the third indicator 616 may correspond to audio of a first user 617. The first user 617 may be identified using a biometric fingerprint of the first user's audio, that is generated and/or stored with the first user's permission. For example, a machine-learning model may be trained to identify the first user 617, based on a data set of audio corresponding to the first user 617. Additionally, or alternatively, a machine-learning model may be trained to recognize a plurality of different users, and of which the first user 617 is one. In such instances, a specific user may not be identified; rather, a plurality of users may be recognized by systems disclosed herein as being different users. Additionally, or alternatively, the first user 617 may be identified using a radio frequency identification tag (RFID), an ID badge, a bar code, a QR code, or some other means of identification that is capable of identifying a user via some technological interface.

The third indicator 616 may provide information to one or more users regarding a noise level (e.g., volume level, such as decibels) of audio from the first user 617 that is received by the device 600 (e.g., based on audio data, such as audio data 110). For example, a height of the third indicator 616 may be adjusted based on a noise level of audio that is received by the device 600. If the noise level increases, then a size or height of the third indicator 616 (e.g., as measured from peripheral edge 608 to the center point 610) may increase. Alternatively, if the noise level decreases, then the size or height of the third indicator 616 may decrease. Further, the third indicator 616 may provide information to a user regarding a direction from which audio from the first user 617 is being received (e.g., based on audio data, such as audio data 110). For example, the third indicator 616 may be generally angled about the center point 610 in the same direction in which audio is received at the device 600. Determining a direction from which audio is received may be based on any conventional method known to those of ordinary skill in the art.

Generally, the third indicator 616 may provide a visualization that informs one or more users of audio from the first user 617 that is received by the device 600. The third indicator 616 may be any of a plurality of hues (e.g., purple), shapes, and/or levels of brightness. Further, when the first user 617 moves about the device 600, the third indicator 616 may move, based on the respective movement of the first user 617. For example, if the first user moves 90 degrees about the center point 610, then the third indicator 616 may move (e.g., rotate) 90 degrees about the center point 610 on the user-interface 606.

The third indicator 616 may be selectable (e.g., via the user-interface 606, and/or via user-inputs that are received, for example, by the device 600). When the third indicator 616 is selected, audio corresponding to the first user 617 may be muted (e.g., using any of the mechanisms for muting disclosed earlier herein). Additionally, using digital signal processing that identifies audio of the first user 617, via, for example, biometric audio data that is collected and/or stored with permission, audio of the user 617 may be muted by the device 600, as the user 617 is stationary, and/or as the user 617 moves about the device 600.

Referring now to the fourth indicator 618 (as shown in FIGS. 6B and 6C), the fourth indicator 618 may correspond to audio of a second user 619. The second user 619 may be identified using a biometric fingerprint of the second user's audio, that is generated and/or stored with the second user's permission. For example, a machine-learning model may be trained to identify the second user 619, based on a data set of audio corresponding to the second user 619. Additionally, or alternatively, a machine-learning model may be trained to recognize a plurality of different users, and of which the second user 619 is one. In such instances, a specific user may not be identified; rather, a plurality of users may be recognized by systems disclosed herein as being different users. Additionally, or alternatively, the second user 619 may be identified using a radio frequency identification tag (RFID), an ID badge, a bar code, a QR code, or some other means of identification that is capable of identifying a user via some technological interface.

The fourth indicator 618 may provide information to one or more users regarding a noise level (e.g., volume level, such as decibels) of audio from the second user 619 that is received by the device 600 (e.g., based on audio data, such as audio data 110). For example, a height of the fourth indicator 618 may be adjusted based on a noise level of audio that is received by the device 600. If the noise level increases, then a size or height of the fourth indicator 618 (e.g., as measured from peripheral edge 608 to the center point 610) may increase. Alternatively, if the noise level decreases, then the size or height of the fourth indicator 618 may decrease. Further, the fourth indicator 618 may provide information to a user regarding a direction from which audio from the second user 619 is being received (e.g., based on audio data, such as audio data 110). For example, the fourth indicator 618 may be generally angled about the center point 610 in the same direction in which audio is received at the device 600. Determining a direction from which audio is received may be based on any conventional method known to those of ordinary skill in the art.

Generally, the fourth indicator 618 may provide a visualization that informs one or more users of audio from the second user 619 that is received by the device 600. The fourth indicator 618 may be any of a plurality of hues (e.g., yellow), shapes, and/or levels of brightness. Further, in some examples, such as the device 600, the third indicator 616 may be a different hue (e.g., color) than the fourth indicator 618. Still further, when the second user 619 moves about the device 600, the fourth indicator 618 may move, based on the respective movement of the second user 619. For example, if the second user 619 moves 90 degrees about the center point 610, then the fourth indicator 618 may move (e.g., rotate) 90 degrees about the center point 610 on the user-interface 606.

The fourth indicator 618 may be selectable (e.g., via the user-interface 606, and/or via user-inputs that are received, for example, by the device 600). When the fourth indicator 618 is selected, audio corresponding to the second user 619 may be muted (e.g., using any of the mechanisms for muting disclosed earlier herein). Additionally, using digital signal processing that identifies audio of the second user 619, via, for example, biometric audio data that is collected and/or stored with permission, audio of the second user 619 may be muted by the device 600, as the second user 619 is stationary, and/or as the second user 619 moves about the device 600.

Figure 7:
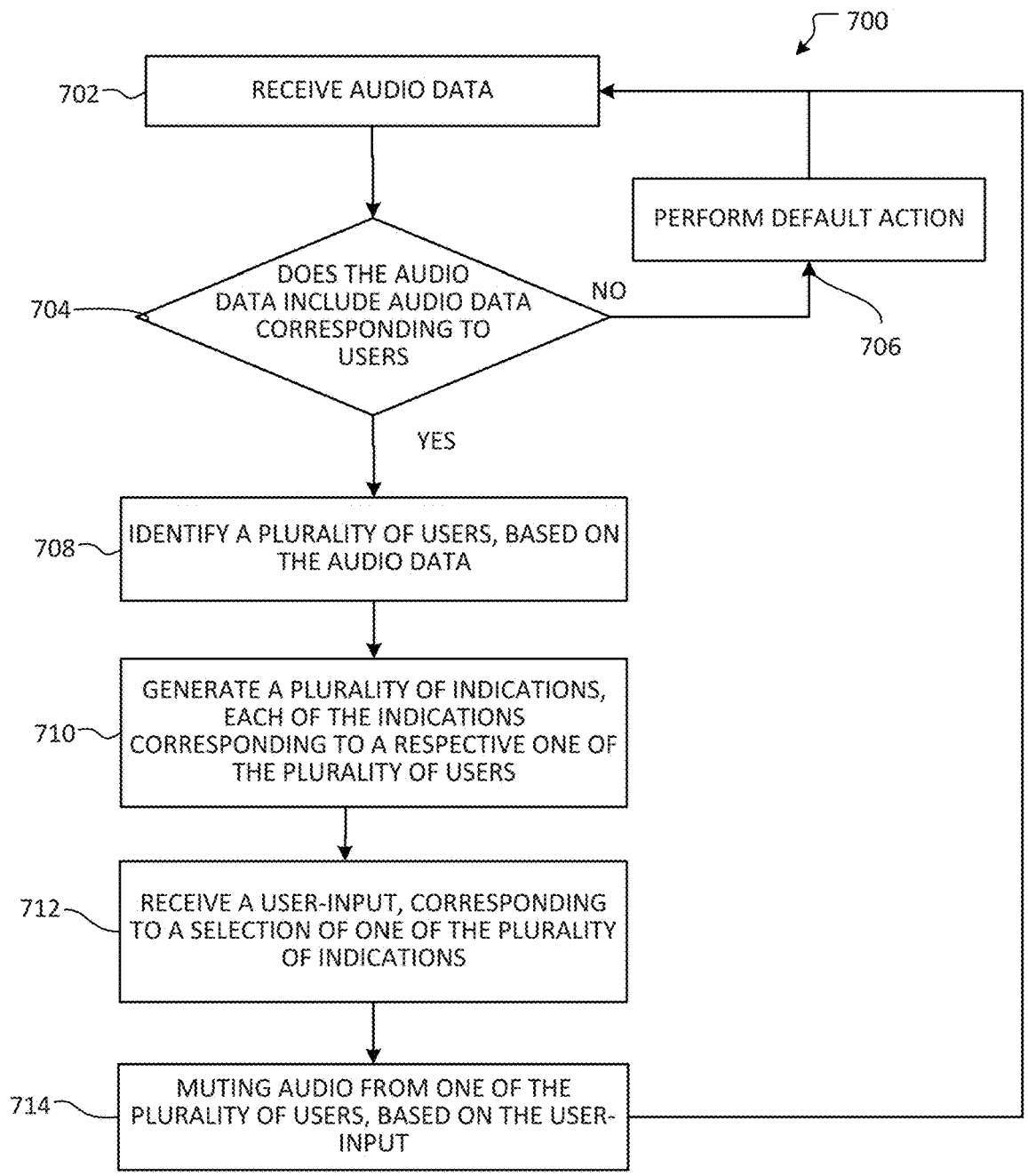
FIG. 7 illustrates an overview of an example method for generating novel visual indications and muting audio from one or more users, according to aspects described herein.

FIG. 7 illustrates an overview of an example method 700 for generating novel visual indications and muting regions of an audio communication device, according to aspects described herein. In examples, aspects of method 700 are performed by computing device 102, server 104, and/or device 600 discussed above with respect to FIGS. 1 and 6A-6C.

Method 700 begins at operation 702, wherein audio data (e.g., audio data 110) is received. The audio data may correspond to audio of one or more users. The audio data may further correspond to ambient noise (e.g., traffic, nearby meetings, animal sounds, etc.). The audio data may be generated by one or more microphones (e.g., microphones 620) that receive noise from an environment and generate audio data, based on the noise, for further processing (e.g., by a processor). Additionally, or alternatively, the audio data may be received from a server (e.g., server 104), or a computing device (e.g., computing device 102) that is remote from a location at which the audio data is received.

At determination 704, it is determined whether the audio data includes audio data corresponding to users (e.g., a plurality of users, such as the first user 617, and the second user 619). For example, audio data may comprise a plurality of signals or bytes that can be cleaned or classified or organized, based on objects to which the signals or byes correspond. In some aspects, a trained machine-learning model, such as a neural network, may be used to identify if aspects of the received audio data correspond to one or more users. Additionally, or alternatively, identifying characteristics of one or more users' audio may be stored in memory (e.g., tone, pitch, volume, etc.), and the determination 504 may be a comparison between received audio data, and the identifying characteristics of one or more users' audio to classify data as corresponding to the one or more users, or not (based on a margin of error).

If it is determined that there is not audio data that corresponds to one or more users, flow branches "NO" to operation 706, where a default action is performed. For example, the received audio data may have an associated pre-configured action. In some examples, the method 700 may comprise determining whether the audio data has an associated default action, such that, in some instances, no action may be performed as a result of the received audio data. Method 700 may terminate at operation 706. Alternatively, method 700 may return to operation 702, from operation 704, to create a continuous feedback loop of receiving audio data and determining whether the received audio data contains audio data that corresponds to one or more users.

If however, it is determined that there is a first subset of the audio data that corresponds to one or more users, flow instead branches "YES" to operation 708, where a plurality of users are identified, based on the audio data. The plurality of users may each be identified using a biometric fingerprint of each of the users' audio, that is generated and/or stored with each the users' permission. For example, a machine-learning model may be trained to identify each of the users, based on a data set of audio corresponding to each of the users. Additionally, or alternatively, a machine-learning model may be trained to recognize a plurality of different users, such as a first user (e.g., first user 617) and a second user (e.g., second user 619). In such instances, a specific user may not be identified; rather, a plurality of users may be recognized by systems disclosed herein as being different users. Additionally, or alternatively, the users may be identified using a radio frequency identification tag (RFID), an ID badge, a bar code, a QR code, or some other means of identification that is capable of identifying a user via some technological interface.

At operation 710, a plurality of indications are generated (e.g., the third indication 616, and the fourth indication 618). Each of the indications correspond to a respective one of the plurality of users (e.g., the third indication 616 corresponding to the first user 617, and the fourth indication 618 corresponding to the second user 619). The plurality of indicators may provide a visualization that informs one or more users of audio, from each of a plurality of users, that is received by the device 600.

The plurality of indicators generated at operation 710 may each be any of a plurality of hues, shapes, and/or levels of brightness. Further, in some examples, the plurality of indicators may each be different hues or colors to visually differentiate the indicators to a user. In other examples, the plurality of indicators may each be the same color, and may otherwise be differentiated, such as with graphical displays, patterns, or sounds. Still further, each of the plurality of indications may be located on, translated across, or rotated about a device, based on a movement of the respective one of the plurality of users to which the indication corresponds.

At operation 712, a user-input is received that corresponds to a selection of one of the plurality of indications. For example, each of the plurality of indications may be selectable (e.g., via the user-interface 606, and/or via user-inputs that are received, for example, by the device 600). For example, a user-interface of a device may include a plurality of buttons, and clicking one of the buttons that is closest to an indication that is desired to be selected may generate the user-input. Additionally, or alternatively, the user-input may be a verbal command from a user, such as a verbal command indicative of selecting one of the plurality of indications. Additionally, or alternatively, the user-input may be a text-based command that is input via a keyboard, and or that is transmitted to the device, via a network. Additionally, or alternatively, the user-input may be a gesture (e.g., a hand gesture, or gesture with an object, etc.).

Flow advances to operation 714, wherein audio is muted from one of the plurality of users (e.g., identified in operation 708), based on the user-input. The user-input corresponds to a selection of one of the plurality of indications, which corresponds to one of the plurality of users. Therefore, the user-input may correspond to a selection of one of the plurality of users whose audio is desired to be muted (or, in some examples, unmuted, if the one of the plurality of users is currently muted). As discussed above, the plurality of users may each be identified using biometric audio data (e.g., using one or more machine-learning models that are trained to identify users based on data sets including audio data that correspond to each of the users). Accordingly, in some examples, mechanisms disclosed herein may filter out (e.g., via digital signal processing) a subset of the audio data. The subset of the audio data corresponds to the one of the plurality of users whose audio is desired to be muted. In some examples, the audio of the user may be muted, as the user walks about an audio communication (e.g., device 600).

Method 700 may terminate at operation 714. Alternatively, method 700 may return to operation 702, from operation 714. The plurality of indications may provide information regarding how many different users are speaking, from what direction they are speaking, and how loudly they are speaking, such that corrective action can be taken (e.g., muting one or more regions of an audio communication device, muting one or more of the users, via digital signal processing, or other corrective actions, as discussed earlier herein).

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, described herein.

Figure 8:
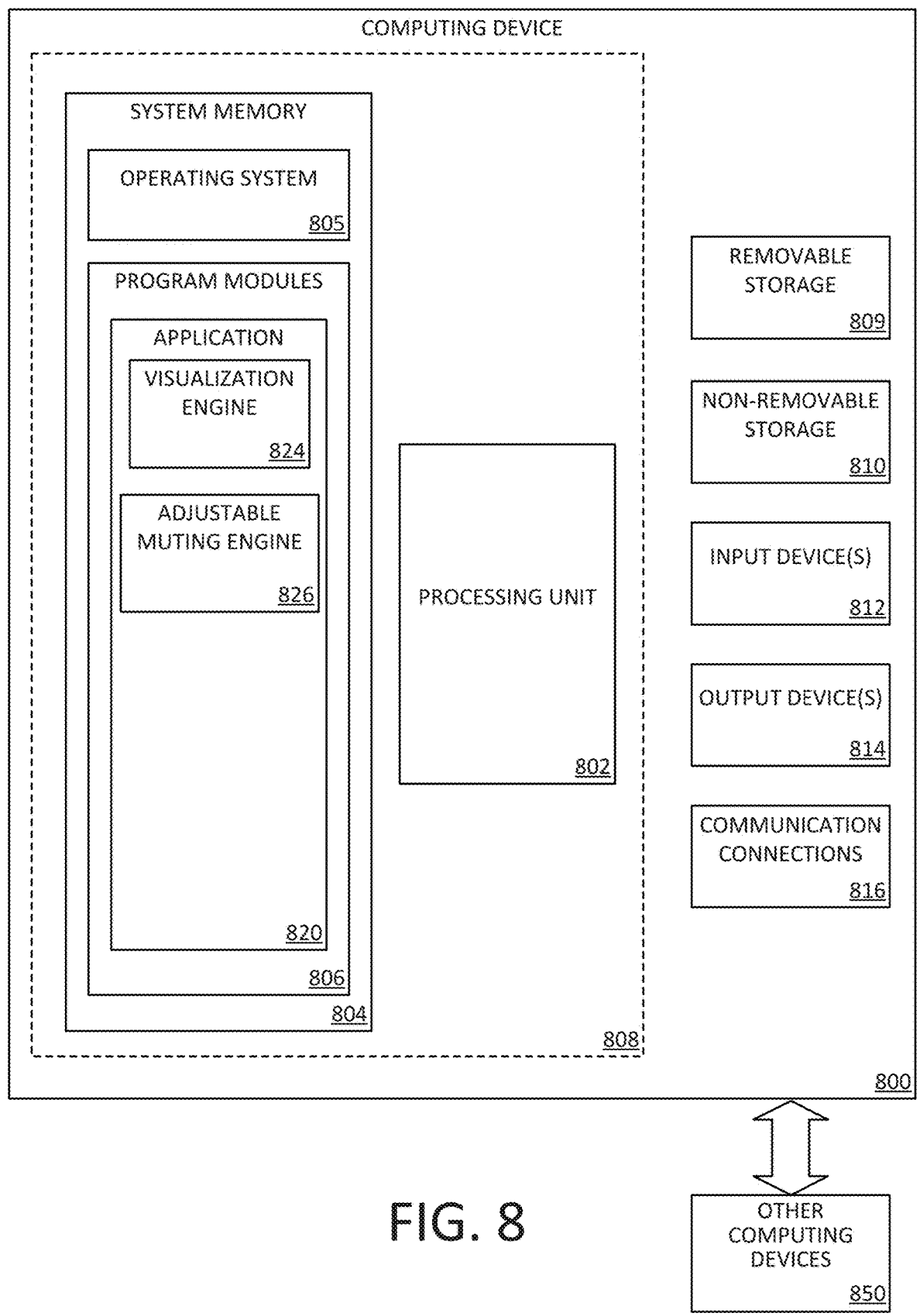
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may be suitable for the computing devices described above, including computing device 102 in FIG. 1, or the devices 200, 400, 600 of FIGS. 2, 4 and 6. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories.

The system memory 804 may include an operating system 805 and one or more program modules 806 suitable for running software application 820, such as one or more components supported by the systems described herein. As examples, system memory 804 may store visualization engine or component 824 and adjustable muting engine or component 826. The operating system 805, for example, may be suitable for controlling the operation of the computing device 800.

Furthermore, aspects of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., application 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Some aspects of the disclosure may also be practiced using other technologies capable of performing logical operations such as, for example, AND, OR, and NOT, including but not limited to mechanical, optical, fluidic, and quantum technologies. In addition, some aspects of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
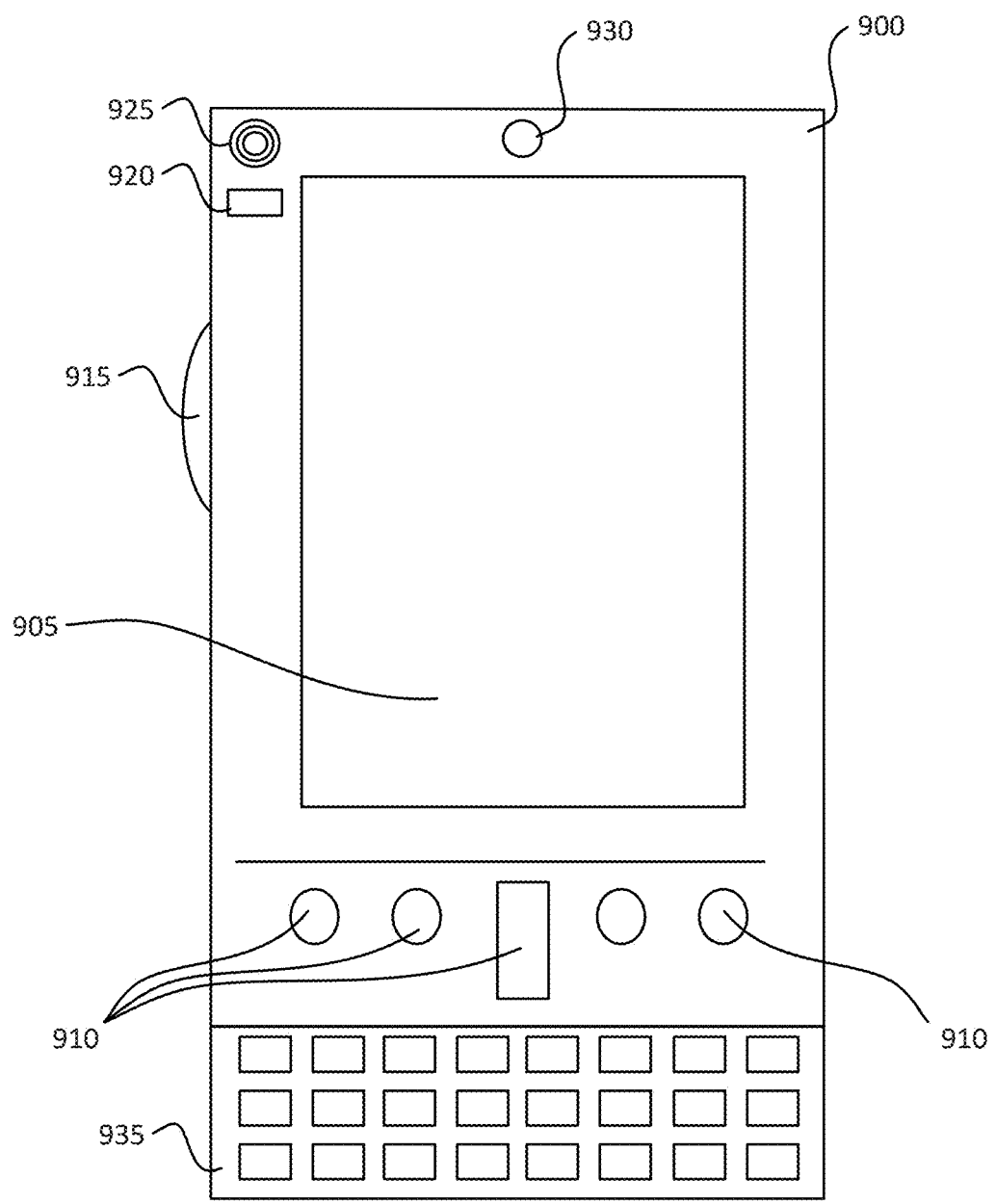
FIGS. 9A and 9B are simplified block diagrams of a mobile computing device with which aspects of the present disclosure may be practiced.
Figure 9B:
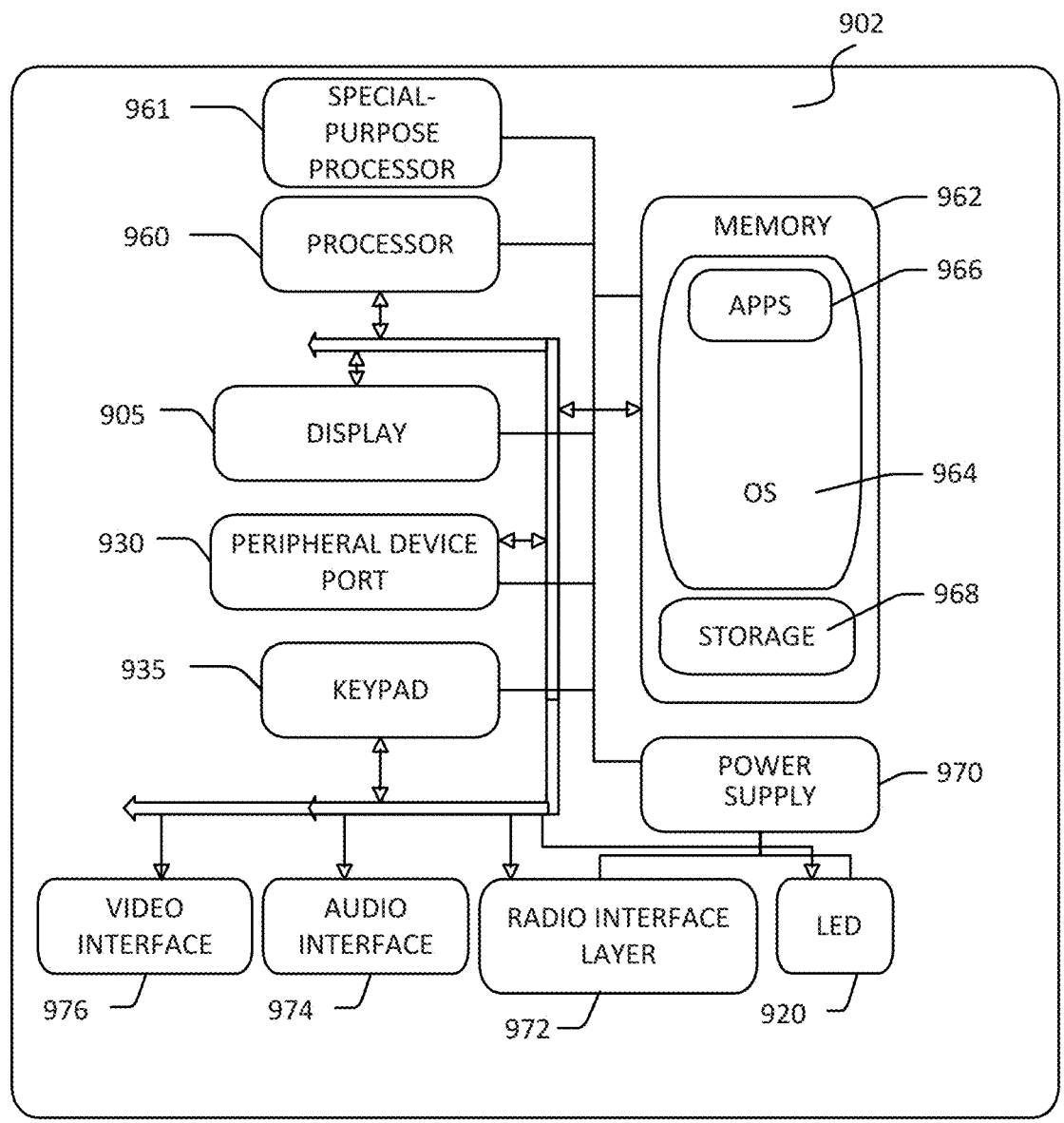

FIGS. 9A and 9B illustrate a mobile computing device 900, for example, a mobile telephone, a smart phone, wearable computer (such as a smart watch), a tablet computer, a laptop computer, and the like, with which some aspects of the disclosure may be practiced. In some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display).

If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some examples.

In yet another alternative example, the mobile computing device 900 is a portable phone system, such as a cellular phone. The mobile computing device 900 may also include an optional keypad 935. Optional keypad 935 may be a physical keypad or a "soft" keypad generated on the touch screen display.

In various examples, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In some examples, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g., a visualization engine, adjustable muting engine, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and/or special-purpose processor 961 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with aspects of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
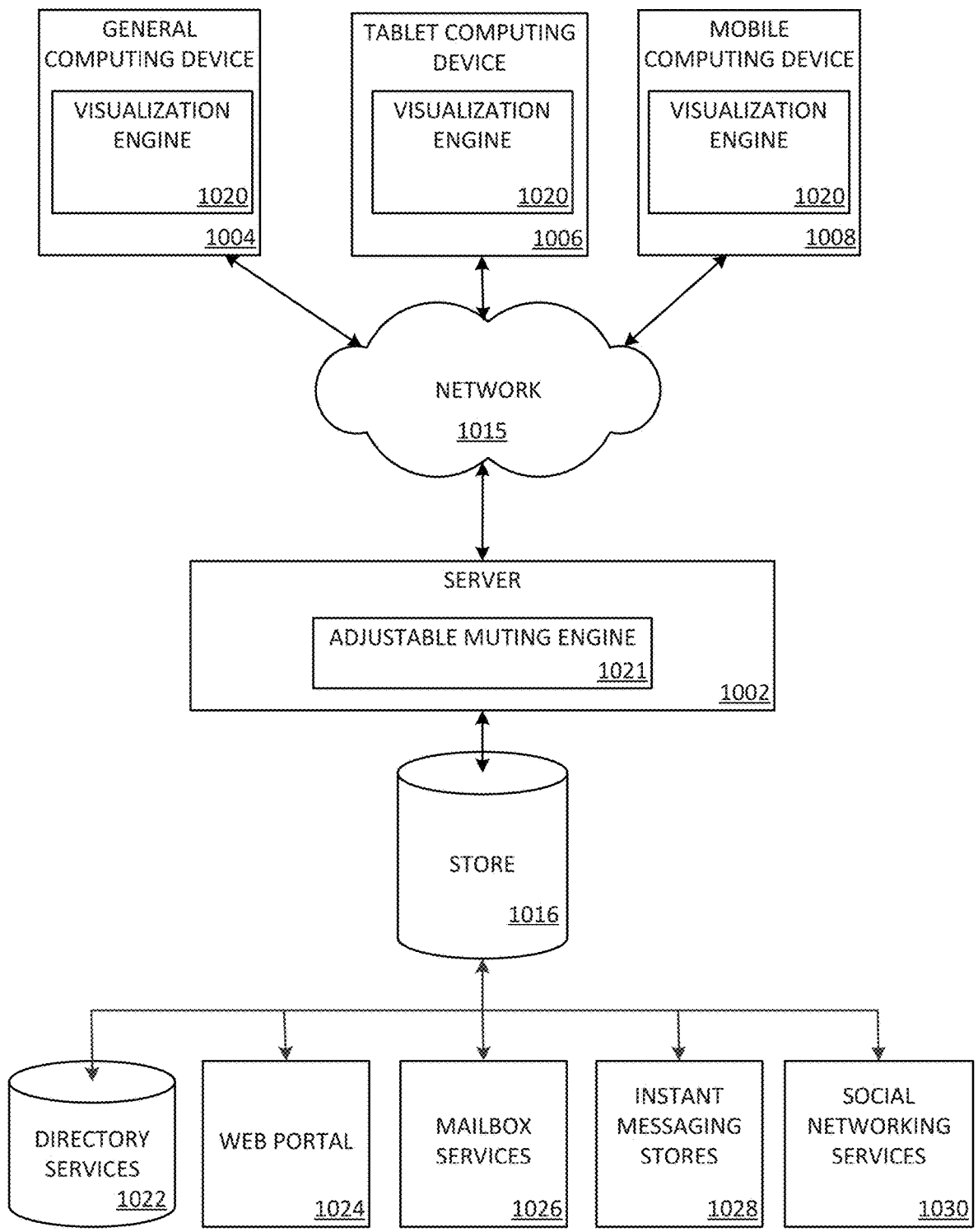
FIG. 10 is a simplified block diagram of a distributed computing system in which aspects of the present disclosure may be practiced.

FIG. 10 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030.

A visualization engine or component 1020 may be employed by a client that communicates with server device 1002, and/or adjustable muting engine or component 1021 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these examples of the computing devices may obtain content from the store 1016, in addition to receiving graphical data useable to be either pre-processed at a graphic-originating system, or post-processed at a receiving computing system.

Figure 11:
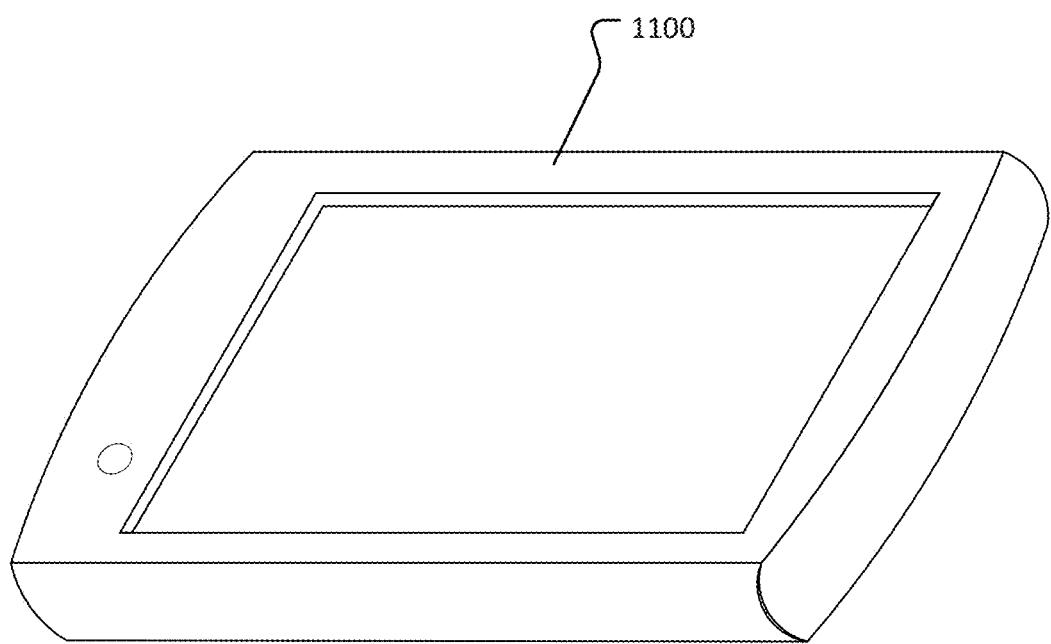
FIG. 11 illustrates a tablet computing device for executing one or more aspects of the present disclosure.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the present disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. An audio communication device comprising:
at least one processor; and
memory storing instructions that, when executed by the at least one processor, cause the audio communication device to perform a set of operations, the set of operations including:
generating a plurality of indicators, the plurality of indicators comprising a first indicator corresponding to audio of a first user and a second indicator corresponding to audio of a second user;
causing the first indicator to be displayed visually larger in size than the second indicator, when a noise level of the audio of the first user is higher than a noise level of the audio of the second user;
receiving a user-input;
muting a region of the audio communication device, based on the user-input; and
generating a third indicator, the third indicator replacing at least a portion of the first indicator or the second indicator, and the third indicator corresponding to the muted region,
wherein the first indicator is indicative of a quality of the audio, and wherein the quality of the audio is determined based on one or more values from the group consisting of a signal-to-noise ratio, a signal-to-reverberation ratio, a signal-to-interference ratio, and a mean opinion score.

2. The audio communication device of claim 1, wherein the first indicator is a visual indicator that includes a first hue, when the audio quality is above a first threshold, and that includes a second hue, when the audio quality is below the first threshold.

3. The audio communication device of claim 1, wherein the third indicator is visual indicator that has a different hue than the first indicator.

4. The audio communication device of claim 1, wherein the muting of the region comprises performing noise-cancelling digital processing on audio data that is determined to originate from a direction corresponding to the muted region.

5. The audio communication device of claim 4, wherein a gain of the noise-cancelling digital processing is adjustable, based on the user-input.

6. The audio communication device of claim 1, wherein the receiving of the user-input comprises receiving a plurality of user-inputs, and wherein the generating of the third indicator comprises generating a plurality of third indicators that each replace a portion of the first indicator.

7. The audio communication device of claim 1, wherein the receiving of the user-input comprises receiving a plurality of user-inputs, and wherein each indicator of the plurality of indicators correspond to audio of a respective one of the plurality of users.

8. The audio communication device of claim 1, wherein the set of operations further include:
causing the first indication to be displayed visually smaller in size than the second indication, when a noise level of the first user is lower than a noise level of the second user.

9. The audio communication device of claim 1, further comprising a base, wherein the base defines a compass, and wherein the direction corresponding to the muted region is the direction along which a polar vector extends, from the geometric center of the base, through the muted region, to a source of the noise.

10. The audio communication device of claim 9, further comprising:
detecting a movement of the audio of the first user about the base; and
moving the first indication based on the respective movement of the audio of the first user.

11. The audio communication device of claim 1, further comprising a touchscreen display, wherein the user-input is received via the touchscreen display.

12. The audio communication device of claim 1, wherein the first indicator corresponding to the audio of the first user and the second indicator corresponding to the audio of the second user have different hues when receiving the audio from both the first user and the second user.

13. An audio communication device comprising:
a base defining a plane extending thereacross;
at least one processor; and
memory storing instructions that, when executed by the at least one processor, cause the audio communication device to perform a set of operations, the set of operations including:
receiving audio data;
generating a first indicator, the first indicator corresponding to a first subset of the audio data, the first subset corresponding to a first user;
generating a second indicator, the second indicator corresponding to a second subset of the audio data, the second subset corresponding to a second user;
causing the first indicator to be displayed visually larger in size than the second indicator, when a noise level of the first subset of the audio data is higher than a noise level of the second subset of the audio data;
generating a third indicator, the third indicator corresponding to a third subset of the audio data, the third subset corresponding to ambient noise, wherein one of the first indicator or the third indicator are capable of overlaying the other of the first indicator or the third indicator, with respect to the plane, to indicate a potential disturbance of the ambient noise on audio quality of the first user;
receiving a user-input, based on the third indicator; and
muting a region of the audio communication device, based on the user-input, wherein the muting of the region comprises performing digital processing on the audio data to filter out noise that is determined to originate from a direction corresponding to the muted region.

14. The audio communication device of claim 13, wherein the base defines a compass, and wherein the direction corresponding to the muted region is the direction along which a polar vector extends, from the geometric center of the base, through the muted region, to a source of the noise.

15. The audio communication device of claim 13, wherein the first indicator is visually indicative of a direction along which the one or more users are located.

16. An audio communication device comprising:
at least one processor; and
memory storing instructions that, when executed by the at least one processor, cause the audio communication device to perform a set of operations, the set of operations including:
receiving audio data;
identifying a plurality of users, based on the audio data;
generating a plurality of indications, each of the indications corresponding to a respective one of the plurality of users, wherein the plurality of indications comprise a first indication and a second indication, and wherein the first indication and the second indication correspond to a first user and a second user, respectively;
causing the first indication to be displayed visually larger in size than the second indication, when a noise level of the first user is higher than a noise level of the second user;
receiving a user-input, corresponding to a selection of one of the plurality of indications; and
muting audio from one of the plurality of users, based on the user-input,
wherein the muting of the audio from the one of the plurality of users comprises filtering out a subset of the audio data, wherein the subset of the audio data corresponds to the one of the plurality of users, and
wherein, when the plurality of users move about the audio communication device, the plurality of indications move, based on the respective movements of the corresponding users.

17. The audio communication device of claim 16, wherein each of the plurality of indications comprise a different color.

18. The audio communication device of claim 16, wherein the filtering comprises digital signal processing.

19. The audio communication device of claim 16, wherein the identification of the plurality of users is performed by one or more trained machine-learning models.

20. The audio communication device of claim 16, wherein the first indication decreases in size, when a noise level of the first user decreases.

* * * * *